US012398301B2

(12) United States Patent
Leone et al.

(10) Patent No.: US 12,398,301 B2
(45) Date of Patent: *Aug. 26, 2025

(54) ADHESIVES COMPRISING CYCLIC IMIDE ADDITION-FRAGMENTATION AND ADHESION AGENTS

(71) Applicant: 3M INNOVATIVE PROPERTIES COMPANY, St. Paul, MN (US)

(72) Inventors: Amanda K. Leone, St. Paul, MN (US); Jonathan J. Anderson, New Brighton, MN (US); Guy D. Joly, Shoreview, MN (US); Ahmed S. Abuelyaman, Woodbury, MN (US); Michael A. Kropp, Cottage Grove, MN (US); Claire Hartmann-Thompson, Lake Elmo, MN (US); Wayne S. Mahoney, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/706,151

(22) PCT Filed: Nov. 18, 2022

(86) PCT No.: PCT/IB2022/061147
§ 371 (c)(1),
(2) Date: Apr. 30, 2024

(87) PCT Pub. No.: WO2023/105327
PCT Pub. Date: Jun. 15, 2023

(65) Prior Publication Data
US 2025/0011633 A1  Jan. 9, 2025

Related U.S. Application Data

(60) Provisional application No. 63/338,100, filed on May 4, 2022, provisional application No. 63/286,285, filed on Dec. 6, 2021.

(51) Int. Cl.
C09J 133/12 (2006.01)
C09J 163/08 (2006.01)

(52) U.S. Cl.
CPC ........... *C09J 133/12* (2013.01); *C09J 163/08* (2013.01)

(58) Field of Classification Search
CPC ..... C09J 133/12; C09J 163/08; C09D 133/24; C09D 135/02; C09D 139/04; C09D 133/02; C08F 222/103; C08F 222/40; C08K 3/36
See application file for complete search history.

(56) References Cited

U.S. PATENT DOCUMENTS

| 3,347,954 | A | 10/1967 | Hellmut et al. |
| 3,637,603 | A | 1/1972 | Hoyt et al. |
| 3,706,716 | A * | 12/1972 | Hoyt et al. ......... C08G 73/0627 526/182 |
| 4,503,169 | A | 3/1985 | Randklev |
| 4,547,323 | A | 10/1985 | Carlson |
| 4,886,861 | A | 12/1989 | Janowicz |
| 5,324,879 | A | 6/1994 | Hawthorne |
| 5,976,690 | A | 11/1999 | Williams et al. |
| 6,037,476 | A | 3/2000 | Belmont |
| 6,284,898 | B1 | 9/2001 | Moszner et al. |
| 6,376,590 | B2 | 4/2002 | Kolb et al. |
| 6,387,981 | B1 | 5/2002 | Zhang et al. |
| 6,572,693 | B1 | 6/2003 | Wu et al. |
| 6,627,384 | B1 | 9/2003 | Kim et al. |
| 6,730,156 | B1 | 5/2004 | Windisch et al. |
| 6,794,520 | B1 | 9/2004 | Moszner et al. |
| 6,893,731 | B2 | 5/2005 | Kausch |
| 7,090,721 | B2 | 8/2006 | Craig et al. |
| 7,090,722 | B2 | 8/2006 | Budd et al. |
| 7,156,911 | B2 | 1/2007 | Kangas et al. |
| 7,241,437 | B2 | 7/2007 | Davidson et al. |
| 7,514,202 | B2 | 4/2009 | Ohsawa et al. |
| 7,649,029 | B2 | 1/2010 | Kolb et al. |
| 7,674,850 | B2 | 3/2010 | Karim et al. |
| 7,943,680 | B2 | 5/2011 | Bowman et al. |

(Continued)

FOREIGN PATENT DOCUMENTS

| DE | 4219700 A1 | 12/1992 |
| EP | 0059451 B1 | 7/1985 |

(Continued)

OTHER PUBLICATIONS

"Epoxy Resins", Encyclopedia of Polymer Science and Engineering, 1986, vol. 06, pp. 322-382.

(Continued)

Primary Examiner — Mark S Kaucher
(74) Attorney, Agent, or Firm — Carolyn A. Fischer

(57) ABSTRACT

An adhesive composition is described comprising at least one cyclic imide monomer comprising an unsaturated carbonyl. The adhesive composition is a polymerizable composition or a polymerized composition. The polymerizable adhesive composition may comprise at least one monomer, oligomer, polymer, or a combination thereof comprising ethylenically unsaturated groups and/or an epoxy resin. The cyclic imide monomer may comprise an imide group with an α, β-unsaturated carbonyl in a heterocyclic ring wherein the ring comprises at least 6 covalently bonded atoms. Also described are methods of forming an adhesive coated substrate and articles.

20 Claims, No Drawings

(56) References Cited

U.S. PATENT DOCUMENTS

| | | | |
|---|---|---|---|
| 8,545,225 | B2 | 10/2013 | Takei et al. |
| 8,647,510 | B2 | 2/2014 | Kolb et al. |
| 9,056,043 | B2 | 6/2015 | Joly et al. |
| 9,237,990 | B2 | 1/2016 | Abuelyaman et al. |
| 9,403,966 | B2 | 8/2016 | Joly et al. |
| 9,410,030 | B2 | 8/2016 | Joly et al. |
| 9,907,733 | B2 | 3/2018 | Joly et al. |
| 9,957,408 | B2 | 5/2018 | Thompson |
| 10,131,811 | B2 | 11/2018 | Herm et al. |
| 10,676,655 | B2 | 6/2020 | Shafer et al. |
| 2004/0006161 | A1 | 1/2004 | Daido et al. |
| 2004/0054079 | A1 | 3/2004 | Su |
| 2004/0225074 | A1 | 11/2004 | Musa |
| 2006/0009574 | A1 | 1/2006 | Aert et al. |
| 2006/0147177 | A1 | 7/2006 | Jing et al. |
| 2006/0148950 | A1 | 7/2006 | Davidson et al. |
| 2008/0076848 | A1 | 3/2008 | Jin et al. |
| 2008/0194722 | A1 | 8/2008 | Abuelyaman et al. |
| 2011/0187009 | A1 | 8/2011 | Masuko et al. |
| 2012/0208965 | A1 | 8/2012 | Joly et al. |
| 2012/0308798 | A1 | 12/2012 | Ryu et al. |
| 2013/0025495 | A1 | 1/2013 | Hood et al. |
| 2014/0220512 | A1 | 8/2014 | Abuelyaman et al. |
| 2015/0238389 | A1 | 8/2015 | Moser et al. |
| 2017/0174835 | A1 | 6/2017 | Hsieh et al. |
| 2017/0210693 | A1 | 7/2017 | Joly et al. |
| 2020/0393762 | A1* | 12/2020 | Ogawa .............. C08F 220/1806 |
| 2021/0011380 | A1 | 1/2021 | Nihashi et al. |
| 2023/0303898 | A1 | 9/2023 | Ostlund et al. |
| 2023/0323151 | A1* | 10/2023 | Joly .......................... C09D 7/68 524/548 |

FOREIGN PATENT DOCUMENTS

| | | |
|---|---|---|
| EP | 2401998 A1 | 1/2012 |
| JP | 07196867 A | 8/1995 |
| JP | 4028026 B2 | 12/2007 |
| JP | 2014513154 A | 5/2014 |
| WO | 2001030305 A1 | 5/2001 |
| WO | 2001030307 A1 | 5/2001 |
| WO | 2002055622 A2 | 7/2002 |
| WO | 2003063804 A1 | 8/2003 |
| WO | 2008082881 A1 | 7/2008 |
| WO | 2009091551 A1 | 7/2009 |
| WO | 2011126647 A2 | 10/2011 |
| WO | 2012003136 A1 | 1/2012 |
| WO | 2012112304 A1 | 8/2012 |
| WO | 2012112321 A2 | 8/2012 |
| WO | 2012112350 A2 | 8/2012 |
| WO | 2013028397 A2 | 2/2013 |
| WO | 2013028401 A1 | 2/2013 |
| WO | 2014092186 A1 | 6/2014 |
| WO | 2014099317 A1 | 6/2014 |
| WO | 2019167725 A1 | 9/2019 |
| WO | 2019187881 A1 | 10/2019 |
| WO | 2022096973 A1 | 5/2022 |
| WO | 2023105315 A1 | 6/2023 |
| WO | 2023187506 A1 | 10/2023 |

OTHER PUBLICATIONS

"Initiators Poly-Reactions-Optical Activity", Acta Polymerica, Advances In Polymer Science, 1985, vol. 36, No. 12, pp. 700-701.
"Miramer M1088", Technical Data Sheet, Miwon Specialty Chemical Co., Ltd., Version 1, 2019, p. 1.
"Structural Adhesive Market Size Worth $31.87 Billion by 2030", Grand View Research, [retrieved from the Internet on Jul. 14, 2023], URL: <https://www.grandviewresearch.com/press-release/global-structural-adhesives-market>, 2023, pp. 1-6.
Alder, "Intramolecular Thermal Cyclization Reactions of Diacryloylamines", Journal of American Chemical Society, 1983, vol. 105, pp. 6712-6714.
Cara, "Influence of Bis-GMA Derivative Monomer-Based Particulate Composite Resins on the Cuspal Deformation and Microleakage of Restored Teeth", Particulate Science and Technology, 2010, vol. 28, pp. 191-206.
Crivello, "Cationic Polymerization—Iodonium and Sulfonium Salt Photoinitiators", Advances in Polymer Science, 1984, vol. 62, pp. 01-48.
Dietliker, "Chemistry and Technology of UV and EB Formulation for Coatings", Inks & Paints, SITA Technology, 1991, vol. III, pp. 276-298.
Enikolopyan, "Catalyzed Chain Transfer to Monomer in Free Radical Polymerization", Journal of Polymer Science: Polymer Chemistry Edition, 1981, vol. 19, pp. 879-889.
Galanti, "The Synthesis of Biscitraconimides and Polybiscitraconimides", Journal of Polymer Science: Part A: Polymer Chemistry, 1981, vol. 19, No. 02, pp. 451-475, XP055410601.
Hutson, "Chain Transfer Activity of w-Unsaturated Methacrylic Oligomers In Polymerizations of Methacrylic Monomers", Macromolecules, 2004, vol. 37, pp. 4441-4452.
International Search Report for PCT International Application No. PCT/IB2021/059626, mailed on Jan. 27, 2022, 5 pages.
International Search report for PCT International Application No. PCT/IB2020/061147, mailed on Feb. 28, 2023, 5 pages.
Kloxin, "Stress Relaxation via Addition-Fragmentation Chain Transfer in a Thiol-ene Photopolymerization", Macromolecules, 2009, vol. 42, pp. 2551-2556.
Lee, "Handbook of Epoxy Resins", 1967, pp. 1-33.
Medway, Heterocycle Construction Using The Biomass-Derived Building Block Itaconic Acid, Green Chemistry, 2014, vol. 16, No. 04, pp. 2084-2101, XP055880150.
Moad, "Chain Transfer Activity of w-Unsaturated Methyl Methacrylate Oligomers", Macromolecules, 1996, vol. 29, pp. 7717-7726.
Sakaguchi, "Testing of Dental Materials and Biomechanics" Craig's Restorative Dental Materials, 13th Edition., (2012), p. 86.
Sarac, "Redox Polymerization", Progress in Polymer Science, 1999, vol. 24, pp. 1149-1204.
Steele, "The physical interaction of gases with crystalline solids: I. Gas-solid energies and properties of isolated adsorbed atoms", Surface & Colloid Science, 1973, vol. 36, No. 01, pp. 317-352.
Wang, "Poly(a-Methyleneglutarimide)s from Radical Polymerization of a-Methyleneglutarimides", Journal of Polymer Science, Part A: Polymer Chemistry, 2018, vol. 56, pp. 1020-1026.
Wulff, "On The Synthesis of C-Glycosyl Compounds Containing Double Bonds Without The Use of Protecting Groups", Carbohydrate Research, 1994, vol. 257, pp. 81-95.
International Search report for PCT International Application No. PCT/IB2020/060513, mailed on Jan. 16, 2023, 4 pages.

* cited by examiner

ADHESIVES COMPRISING CYCLIC IMIDE ADDITION-FRAGMENTATION AND ADHESION AGENTS

SUMMARY

A composition is described comprising an adhesive composition; and at least one cyclic imide monomer comprising an unsaturated carbonyl. The adhesive composition is a polymerizable composition or a polymerized composition. The adhesive composition comprises at least one cyclic imide monomer comprising an unsaturated carbonyl including an α, β-unsaturated carbonyl. In typical embodiments, the adhesive composition comprises less than 10, 9, 8, 7, 6, 5, 4, 3, 2, or 1 wt. % of the cyclic imide monomer.

In some embodiments, the cyclic imide monomer comprises an imide group and the α, β-unsaturated carbonyl in a heterocyclic ring wherein the ring comprises at least 6 covalently bonded atoms. In some embodiments, the cyclic imide monomer has the structure:

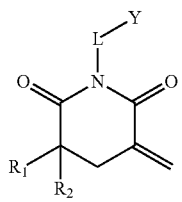

wherein L is a covalent bond or an organic linking group;
Y is alkyl, aryl, hydroxyl, carboxylic acid, or an ethylenically unsaturated polymerizable group; and
$R_1$ and $R_2$ are substituents.

In some embodiments, the cyclic imide monomer comprises at least two cyclic imide groups. A representative structure is as follows

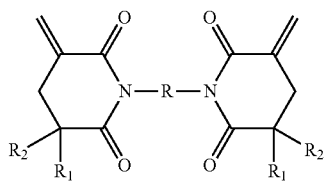

wherein R is an organic linking group; and $R_1$ and $R_2$ are independently substituents.

The cyclic imide monomer typically ring-opens during polymerization thereby forming radicals including C1 to C4 alkyl groups.

In other embodiments, the cyclic imide monomer with a (meth)acrylate group may have the formula $H_2C=CR^3-(C=O)-D-G$ wherein $R^3$ is hydrogen or methyl;
C=O is the unsaturated carbonyl;
D is a divalent linking group comprising an alkylene or substituted alkylene group with 1-24 carbon atoms; and
G is cyclic imide or substituted cyclic imide group (such as cyclohexadienyl carboximide).

In some embodiments, the (e.g. structural) polymerizable adhesive composition typically further comprises at least 50 wt. % of one or more ethylenically unsaturated monomers having a Tg greater than 25 or 50° C. In some embodiments, the (e.g. pressure sensitive) polymerizable adhesive composition typically further comprises at least 50 wt. % of one or more ethylenically unsaturated monomers having a Tg less than 25 or 0° C. The adhesive composition may optionally further comprise organic or inorganic filler particles.

The cyclic imide monomer can relieve polymerization stress and/or promote adhesion. The polymerizable composition typically exhibits a reduction in Watts Deflection and/or improved Crosshatch Adhesion as compared to the same polymerizable composition without the cyclic imide monomer.

In one embodiment, a polymerizable composition is described comprising:
at least one monomer, oligomer, polymer, or a combination thereof comprising ethylenically unsaturated groups; and at least one cyclic imide monomer comprising an α, β-unsaturated carbonyl. The polymerizable composition is an adhesive composition.

In another embodiment, a polymerizable composition is described comprising:
an epoxy resin; and
less than 10 wt-% of at least one cyclic imide monomer comprising an unsaturated carbonyl;
wherein the polymerizable composition is an adhesive composition.

In other embodiments, the polymerizable composition comprises an epoxy resin; at least one monomer, oligomer, polymer, or a combination thereof comprising ethylenically unsaturated groups; and at least one cyclic imide monomer comprising an α, β-unsaturated carbonyl.

Also described is a method of forming an adhesive coated substrate comprising: applying a polymerized composition to a surface of a substrate; or applying the polymerizable composition described herein to a surface of a substrate; and polymerizing the (e.g. ethylenically unsaturated groups and/or epoxy groups of the) composition. The substrate comprises an organic material, an inorganic material, or a combination thereof. The composition is polymerized at room temperature, elevated temperature, upon exposure to radiant energy, or a combination thereof. In some embodiments, the method further comprises contacting the polymerized or polymerizable composition with a second substrate.

Also described are adhesive coated articles.

In another embodiment, a composition is described comprising polymerized units having the structure:

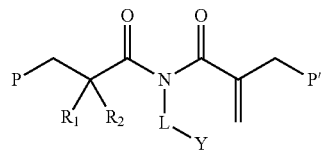

wherein L is a covalent bond or a linking group;
Y is alkyl, aryl, hydroxyl, carboxylic acid, or an ethylenically unsaturated group;
$R_1$ and $R_2$ are independently substituents (e.g. such that the cyclic imide monomer ring-opened during polymerization thereby forming radicals); and
P and P' are independently polymerized units of an ethylenically unsaturated polymerizable monomer, oligomer, polymer, or combination thereof,
wherein the composition is an adhesive composition.

DETAILED DESCRIPTION

Presently described are cyclic imide monomers comprising an (e.g. α, β-) unsaturated carbonyl. In some embodiments, the cyclic imide monomers comprising an α, β-unsaturated carbonyl can act as addition-fragmentation agents in a free-radically polymerizable composition. Alternatively or in combination with addition-fragmentation, cyclic imide monomer comprising an unsaturated carbonyl can promote adhesion to various substrates.

The addition-fragmentation monomer comprises at least one imide group consisting of two acyl groups bound to nitrogen. The cyclic imide monomer described herein further comprises an alpha, beta-unsaturation (α, β-unsaturation), i.e. a pi-bond between the alpha and beta carbons adjacent to a carbonyl group.

The cyclic imide monomers are typically prepared by reacting a dicarboxylic acid comprising an α, β-unsaturated carbonyl with a dehydrating agent, such as acetic anhydride, forming a cyclic compound comprising an anhydride group and an α, β-unsaturated carbonyl; and reacting the anhydride group with an (e.g. primary) amine compound.

The dicarboxylic acids comprise at least three contiguous carbon atoms having an α, β-unsaturated carbonyl between the acid groups. Thus, the imide group and alpha, beta-unsaturation are typically present in a heterocyclic ring wherein the ring comprises at least 6 covalently bonded atoms. In other words, the cyclic imide monomers described herein comprise one or more heterocyclic rings wherein the ring(s) comprise 6 or more covalently bonded atoms in a heterocyclic ring, the heterocyclic ring comprising both an imide group and an α, β-unsaturated carbonyl.

One representative dicarboxylic acid comprising an α, β3-unsaturated carbonyl is depicted as follows:

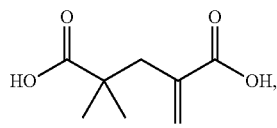

2,2,-dimethyl-4-methylidenepentanedioic acid (also described as 2,4-biscarboxy-4-methylpent-1-ene or 2,2-dimethyl-4-methylene glutaric acid).

In some embodiments, such dicarboxylic acid is used to prepare a cyclic imide monomer comprising a single ring. The cyclic imide monomer may have the structure

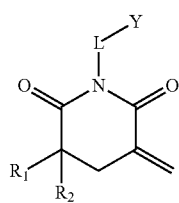

wherein L is a covalent bond or an organic linking group;
Y is alkyl, aryl, hydroxyl, carboxylic acid, or a an ethylenically unsaturated group; and $R_1$ and $R_2$ are independently (e.g. organic) substituents.

In some embodiments, $R_1$ and $R_2$ are independently C1 to C4 alkyl groups (e.g. methyl, ethyl, propyl, or butyl). In some embodiments, $R_1$ and $R_2$ are (e.g. organic) substituents such that the cyclic imide monomer ring-opens during polymerization thereby forming radicals. In some embodiments, $R_1$ and/or $R_2$ are typically not hydrogen.

L typically comprises (hetero)alkylene, (hetero)arylene, or a combination thereof. In some embodiments, the alkylene or arylene linking group (i.e. L) may comprises heteroatoms, such oxygen. For example, L may comprise one or more ester moieties, one or more urethane moieties, and/or one or more pendent hydroxyl groups.

In some embodiments, 2,2-dimethyl-4-methylene glutaric anhydride is used to prepare a cyclic imide monomer comprising two rings or in other words a cyclic bis-imide. The cyclic bis-imide monomer may have the structure:

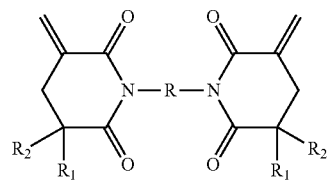

wherein R is an organic linking group, and
$R_1$ and $R_2$ are independently substituents, as previously described.
R typically comprises (hetero)alkylene, (hetero)arylene, or a combination thereof.
In some embodiments, the alkylene or arylene linking group (i.e. R) may comprise heteroatoms, such as oxygen or nitrogen. For example, R may comprise one or more ester moieties, one or more urethane moieties, and/or one or more pendent hydroxyl groups. R may optionally further comprise a pendent ethylenically unsaturated group.

In some embodiments, the cyclic imide monomer comprises at least one (e.g. free-radically polymerizable) ethylenically unsaturated group in combination with the α, β-unsaturation. In this embodiment, Y is a (e.g. free-radically polymerizable) ethylenically unsaturated group or R of the cyclic bis-imide further comprises a pendent (e.g. free-radically polymerizable) ethylenically unsaturated group. In this embodiment, the number of ethylenically unsaturated polymerizable groups of the cyclic imide monomer is >2. In some embodiments, the number of ethylenically unsaturated polymerizable groups of the cyclic imide monomer is no greater than 3.

The one or more additional ethylenically unsaturated groups may include, but are not limited to (meth)acryl (i.e. (meth)acryloyl and (meth)acrylamide), vinyl, styrenic, and ethynyl, depicted as follows:

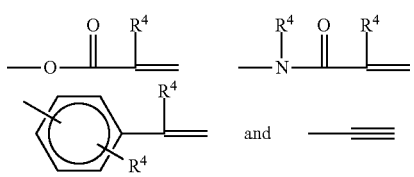

wherein $R^4$ is H or $C_1$-$C_4$ alkyl.
Some representative cyclic imide monomers, as synthesized in the forthcoming examples are as follows:

TABLE A
Imide-Based Addition-Fragmentation Monomers
| Cyclic imide monomers Example No. | Chemical Structure |
|---|---|
| CIM-1 | 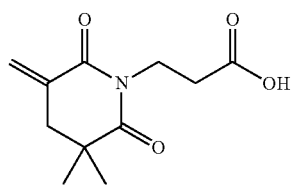 [SMILES: C=C1CC(C)(C)C(=O)N(CCC(=O)O)C1=O] |
| CIM-2 | 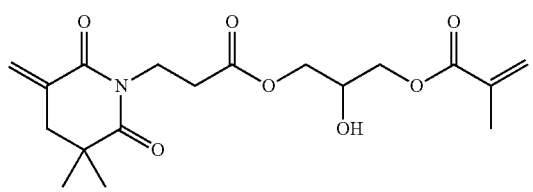 [SMILES: C=C(C)C(=O)OCC(O)COC(=O)CCN1C(=O)C(=C)CC(C)(C)C1=O] |
| CIM-3 | 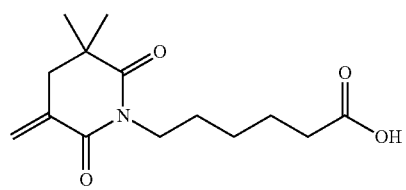 [SMILES: C=C1CC(C)(C)C(=O)N(CCCCCC(=O)O)C1=O] |
| CIM-4 | 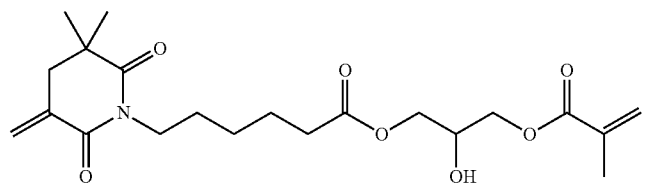 [SMILES: C=C(C)C(=O)OCC(O)COC(=O)CCCCCN1C(=O)C(=C)CC(C)(C)C1=O] |
| CIM-5 | 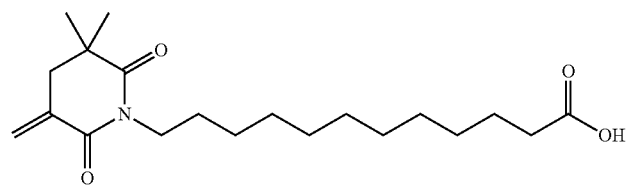 [SMILES: C=C1CC(C)(C)C(=O)N(CCCCCCCCCCCC(=O)O)C1=O] |
| CIM-6 | 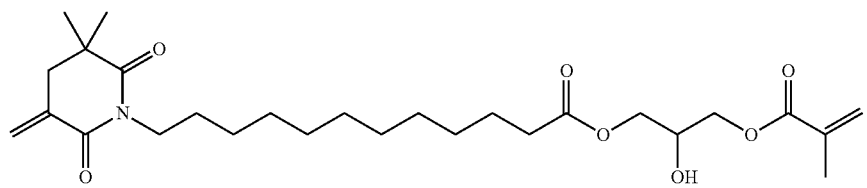 [SMILES: C=C(C)C(=O)OCC(O)COC(=O)CCCCCCCCCCCN1C(=O)C(=C)CC(C)(C)C1=O] |
| CIM-7 | 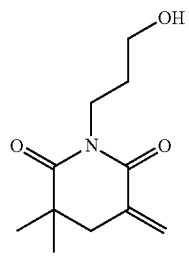 |

TABLE A-continued
Imide-Based Addition-Fragmentation Monomers
| Cyclic imide monomers Example No. | Chemical Structure |
|---|---|
| CIM-8 | 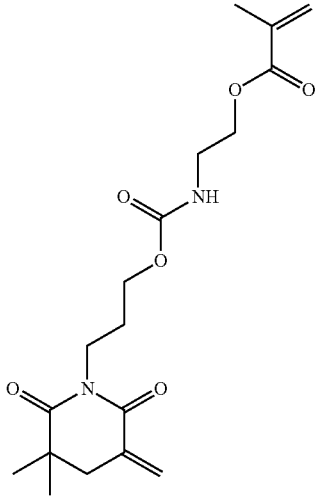 [SMILES: C=C(C)C(=O)OCCNC(=O)OCCCN1C(=O)C(=C)CC(C)(C)C1=O] |
| CIM-9 | 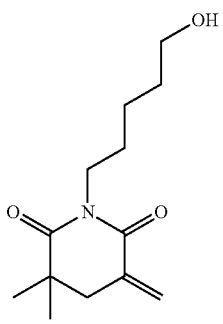 [SMILES: C=C1CC(C)(C)C(=O)N(CCCCCO)C1=O] |
| CIM-10 | 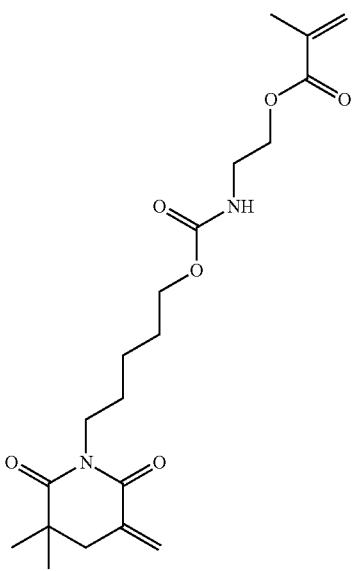 [SMILES: C=C(C)C(=O)OCCNC(=O)OCCCCCN1C(=O)C(=C)CC(C)(C)C1=O] |

TABLE A-continued

Imide-Based Addition-Fragmentation Monomers

| Cyclic imide monomers Example No. | Chemical Structure |
|---|---|
| CIM-11 | (structure: 3,3-dimethyl-5-methylene-1-(2,3-dihydroxypropyl)piperidine-2,6-dione) |
| BCIM-1 | (structure: two 3-methylene-5,5-dimethyl-piperidine-2,6-dione units linked by a hexamethylene chain through the N atoms) |
| BCIM-2 | (structure: two 3-methylene-5,5-dimethyl-piperidine-2,6-dione units linked by an octamethylene chain through the N atoms) |
| BCIM-3 | (structure: two 3-methylene-5,5-dimethyl-piperidine-2,6-dione units linked by a dodecamethylene chain through the N atoms) |
| HBCIM | (structure: two 3-methylene-5,5-dimethyl-piperidine-2,6-dione units linked by a 2-hydroxypropylene bridge through the N atoms) |

TABLE A-continued

Imide-Based Addition-Fragmentation Monomers

Cyclic imide
monomers
Example No.   Chemical Structure

MA-BCM-1

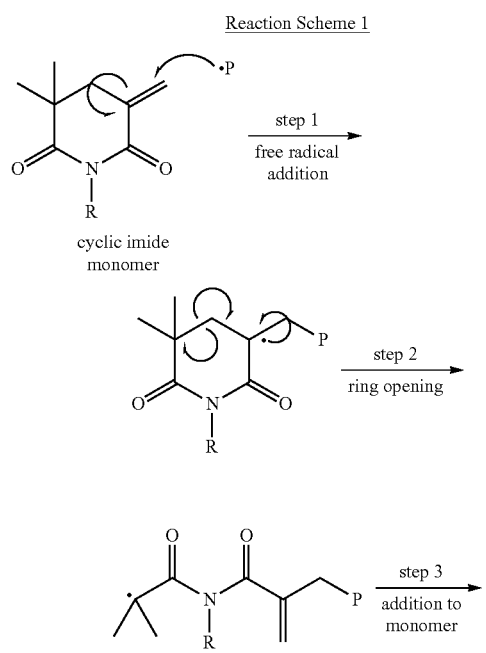

Although these depicted cyclic imide monomers comprise a (meth)acrylate or carboxylic acid group as a representative (e.g. free-radically polymerizable) ethylenically unsaturated group, such monomers can alternatively have (meth)acrylamide, vinyl, styrenic, or ethynyl (e.g. free-radically polymerizable) ethylenically unsaturated groups.

The molecular weight of the cyclic imide monomers is at least 150 g/mole. In typical embodiments, the molecular weight of the monomer is no greater than 1500, 1000, 750, or 500 g/mole.

Without intending to be bound by theory, it is believed that the addition-fragmentation monomer follows an addition-fragmentation pathway as shown in the following representative Reaction Scheme 1, wherein the —R bonded to the nitrogen atom is L-Y, as previously described.

Reaction Scheme 1

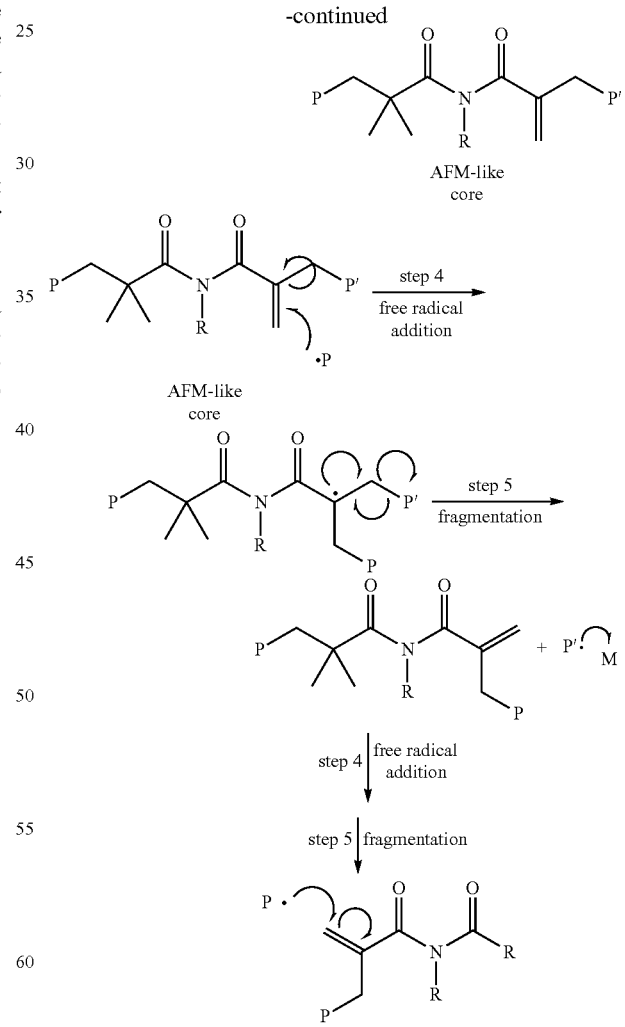

In Scheme 1, Step 1 a free-radically polymerizable ethylenically unsaturated monomer, oligomer, or polymer, represented by P·, adds to the α, β-unsaturation of the cyclic imide monomer. In Step 2, the cyclic monomer ring opens into the following linear imide comprising an α-carbonyl tertiary radical and an α, β-unsaturation

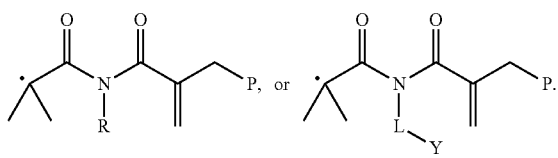

In Step 3, the α-carbonyl tertiary radical (adjacent the pendent dimethyl group) can initiate polymerization of a monomer. Alternatively, the α-carbonyl tertiary radical can react with another α-carbonyl tertiary radical to terminate the chain.

In Step 4, a free-radically polymerizable ethylenically unsaturated oligomer or polymer, represented by P·, adds to the α,β-unsaturation of the cyclic imide monomer. When at least two of the P groups are polymer chains, this reaction may be characterized as crosslinking.

The crosslink can fragment as shown in Step 5 to form a stable α-carbonyl tertiary radical (represented by P'·), which can react with a monomer (represented by M) and a residue bearing an α,β-unsaturation. The α,β-unsaturation can undergo radical addition, as depicted in Step 4, that can subsequently fragment, as depicted in Step 5. Thus, Steps 4 and 5 can be repeated to further relieve polymerization stress.

As shown in Reaction Scheme 1, the addition-fragmentation cyclic imide comprising an α,β-unsaturation monomer, but lacking an additional ethylenically unsaturated polymerizable group provides several mechanisms for stress relief. Further, stress relief may also be a result of slower cure rates in the presence of the cyclic imide addition-fragmentation monomers, delaying the gel point. Post-gel shrinkage is a major component in stress development; therefore, delaying the gel point even slightly may lead to stress relief by allowing additional time for material to flow during the curing process.

In another embodiment, the imide ring structure comprises an alpha, beta-unsaturation and at least one additional (e.g. free-radically polymerizable) ethylenically unsaturated group. As depicted in the following Reaction Scheme 2, such cyclic imide monomers can provide all the same polymer and monomer additions as well as ring-opening and chain cleavage fragmentations as depicted in Reaction Scheme 1. In this embodiment, the additional ethylenically unsaturated group can also polymerize, or in other words crosslink.

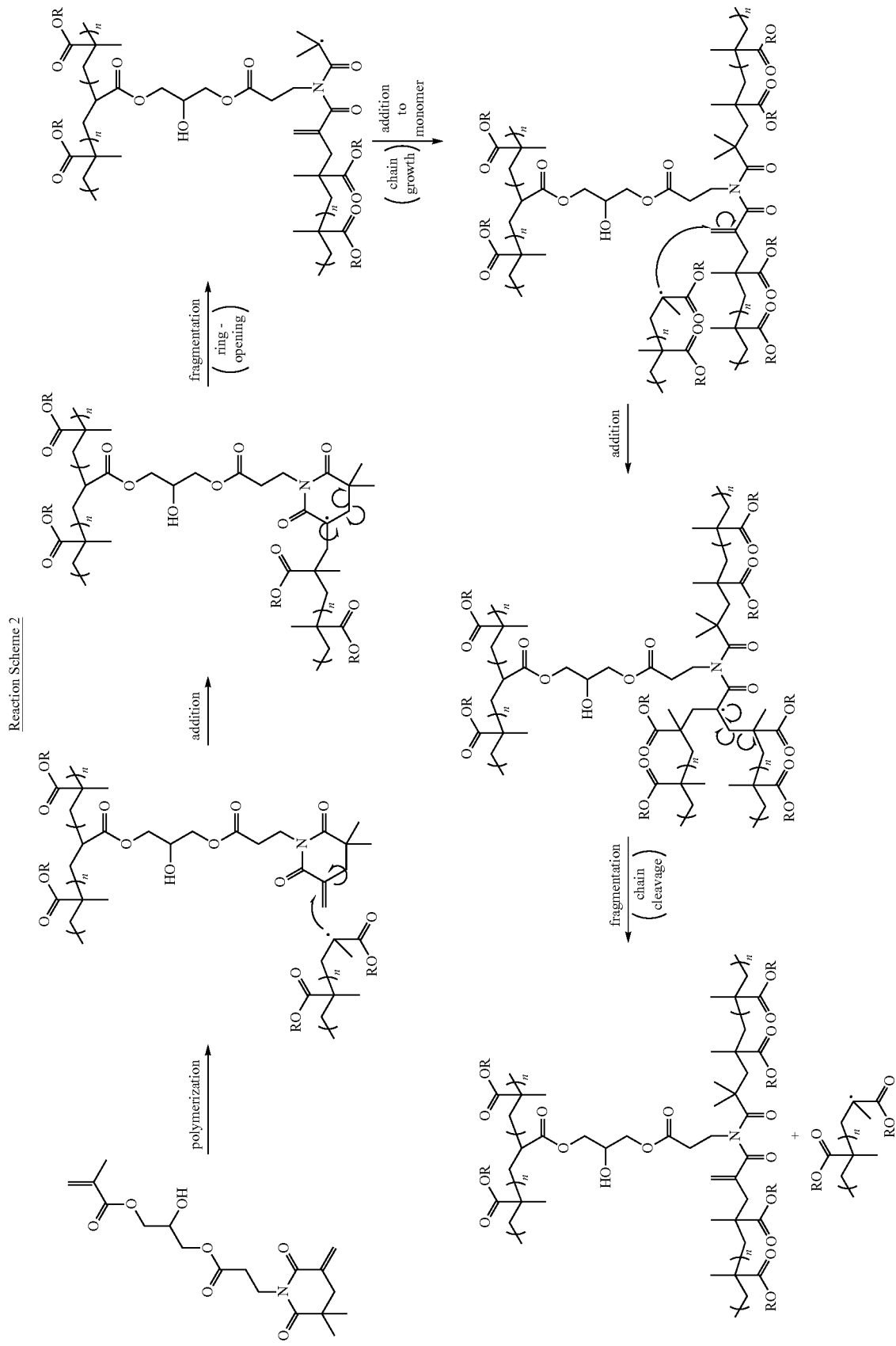
Reaction Scheme 2

Although Reaction Scheme 2 is depicted with a cyclic imide monomer having a specific -L-Y group bonded to the nitrogen atom, the cyclic imide monomer may comprise other -L-Y groups as described herein.

In another embodiment, the cyclic imide monomer comprises at least two imide ring structures that comprise an $\alpha,\beta$-unsaturation. As depicted in the following Reaction Scheme 3, such cyclic imide monomer can provide all the same polymer and monomer additions as well as ring-opening and chain cleavage fragmentations as depicted in Reaction Scheme 1. In the following Reaction Scheme 3, both imide ring structures are depicted as concurrently ring opening following by concurrent monomer addition. However, such addition and fragmentation reactions can also occur sequentially or in other words, each ring can react independently. Further, the R group may comprise an additional pendent (e.g. free radically polymerizable) ethylenically unsaturated group -L-Y, as will subsequently be described. In this embodiment, the cyclic imide can also polymerize, or in other words crosslink as depicted in Reaction Scheme 2.

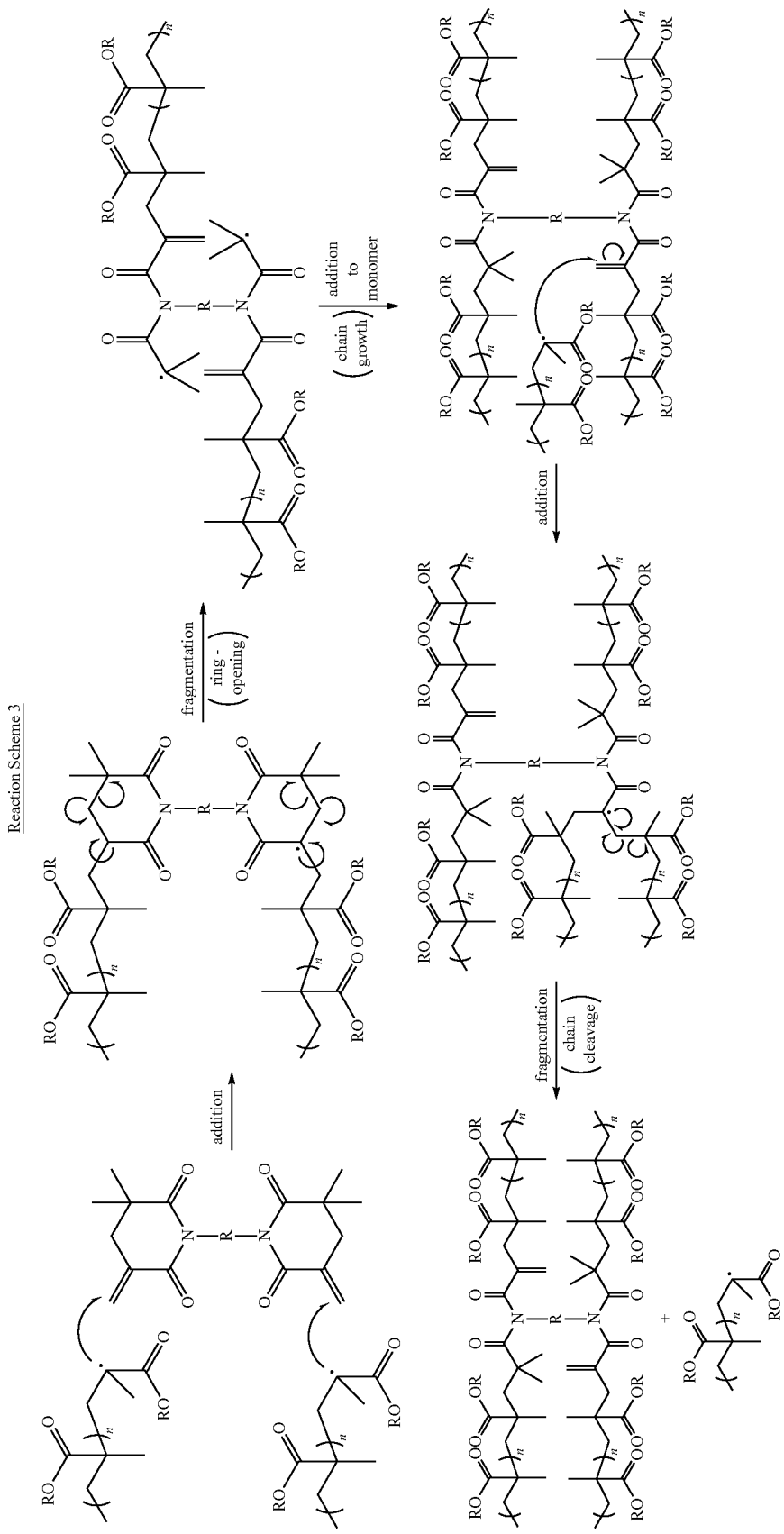

Although Reaction Schemes 1-3 are depicted with a specific 6-membered cyclic imide monomer, other cyclic imide monomers comprising at least 6 covalently bonded atoms and an α,β-unsaturation would follow the same or similar addition-fragmentation pathway.

In one embodiment, the cyclic imide monomer is prepared by reacting a dicarboxylic acid comprising an α, β-unsaturated carbonyl with a dehydrating agent forming a cyclic compound comprising an anhydride group and an α, β-unsaturated carbonyl; and reacting the anhydride group with a compound comprising an amine group and a unreactive group such as alkyl or aryl or a reactive group such as carboxylic acid or hydroxyl group forming a cyclic compound comprising an α, β-unsaturated carbonyl and an imide group.

One representative dicarboxylic acid is 2,2,-dimethyl-4-methylidenepentanedioic acid, as previously described. Other dicarboxylic acids can be utilized provided that the dicarboxylic acids comprise at least three contiguous carbon atoms bearing an α, β-unsaturated carbonyl between the acid groups, as previously described.

Suitable dehydrating agents including acid anhydrides such as acetic anhydride and trifluoroacetic anhydride; phosphorus-based dehydrating agents such as phosphorus pentachloride or phosphorus pentoxide, carbodiimide-based dehydrating agents such as dicyclohexylcarbodiimide.

Representative compounds comprising an (e.g. primary) amine group and an alkyl or aryl terminal group include 4-aminostyrene, butyl amine, pentyl amine, hexyl amine, phenethylamine and benzyl amine.

A representative reaction scheme is as follows:

Reaction Scheme 4

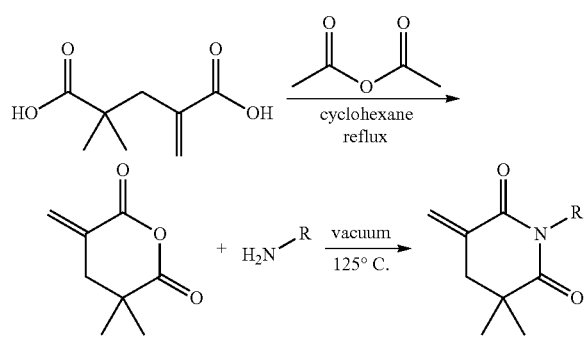

Suitable (e.g. aliphatic) compounds comprising an amine group and a carboxylic acid group typically comprise a primary amine group bonded to a terminal acid group by means of an alkylene linking group. The alkylene linking group typically comprises 2-12 carbon atoms. Representative examples include for example 3-aminopropanoic acid, 4-aminobutanoic acid, 3-aminobutanoic acid, 2-aminobutanoic acid, 5-aminopentanoic acid, 2-aminopentanoic acid, 3-aminopentanoic acid, 4-aminopentanoic acid, 6-aminohexanoic acid, 2-aminohexanoic acid, 3-aminohexanoic acid, 4-aminohexanoic acid, 5-aminohexanoic acid, 7-aminoheptanoic acid, 6-aminoheptanoic acid, 5-aminoheptanoic acid, 4-aminoheptanoic acid, 3-aminoheptanoic acid, 2-aminoheptanoic acid, 8-aminooctanoic acid, 7-aminooctanoic acid, 6-aminooctanoic acid, 5-aminooctanoic acid, 4-aminooctanoic acid, 3-aminooctanoic acid, 2-aminoocatanoic acid, 6-amino caproic acid, and 12-aminododecanoic acid. Other suitable compounds comprising an amine group and a carboxylic acid group include (e.g. naturally occurring) amino acids such as glycine, alanine, valine, isoleucine, leucine, methionine, cysteine, phenylalanine, serine (also has an alcohol), threonine (alcohol as well), tyrosine, tryptophan, asparagine, glutamine, glutamic acid, and aspartic acid, histidine, arginine, or lysine.

A representative reaction scheme is as follows:

Reaction Scheme 5

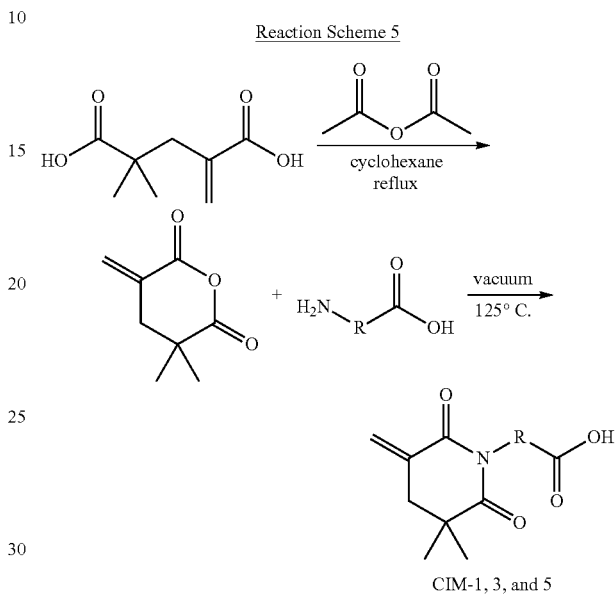

CIM-1, 3, and 5

In some embodiments, the method of preparing the cyclic imide monomer further comprises reacting the carboxylic acid group with a compound comprising an acid reactive group and an ethylenically unsaturated (e.g. free radically polymerizable) group.

The acid reactive group is typically an epoxy group or an aziridinyl group.

Representative epoxy compounds include glycidyl (meth)acrylate, thioglycidyl (meth)acrylate, 3-(2,3-epoxypropoxy) phenyl (meth)acrylate, 2-[4-(2,3-epoxypropoxy)phenyl]-2-(4-(meth)acryloyloxy-phenyl)propane, 4-(2,3-epoxypropoxy)cyclohexyl (meth)acrylate, 2,3-epoxycyclohexyl (meth)acrylate, 3,4-epoxycyclohexyl (meth)acrylate, and 4-hydroxybutylacrylate glycidyl ether.

Representative aziridinyl compounds include N-(meth)acryloylaziridine, 2-(1-aziridinyl)ethyl (meth)acrylate, 4-(1-aziridinyl)butyl acrylate, 2-[2-(1-aziridinyl)ethoxy]ethyl (meth)acrylate, 2-[2-(1-aziridinyl)ethoxycarbonylamino] ethyl (meth)acrylate, 12-[2-(2,2,3,3-tetramethyl-1-aziridinyl)ethoxycarbonylamino] dodecyl (meth)acrylate, and 1-(2-propenyl)aziridine.

A representative reaction scheme is as follows:

Reaction Scheme 6

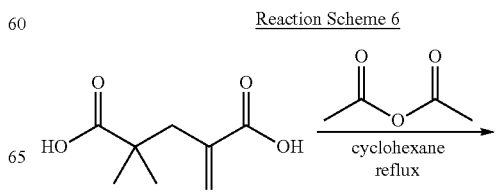

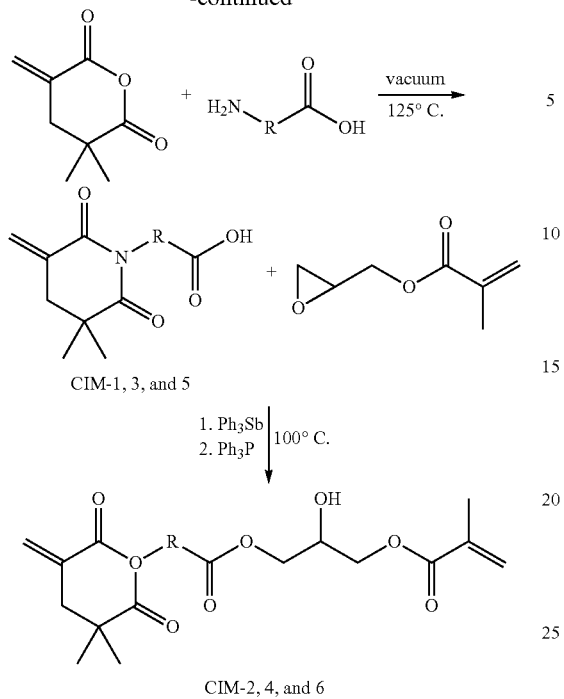

CIM-1, 3, and 5

1. Ph₃Sb
2. Ph₃P  100° C.

CIM-2, 4, and 6

The reaction of carboxylic acid with aziridinyl compounds is depicted in WO2012/112304.

Suitable compounds comprising an amine group and one or more hydroxyl groups including diols. Representative compounds include for example 3-amino-1-propanol, 5-amino-1-pentanol, 3-amino-1,2-propanediol.

The cyclic imide compounds having a hydroxyl group can be reacted with a compound comprising an isocyanate group and a (meth)acrylate group. Representative isocyanate compounds include 2-isocyanatoethyl (meth)acrylate, 3-isocyanatopropyl (meth)acrylate, 4-isocyanatocyclohexyl (meth)acrylate, 4-isocyanatostyrene, 2-methyl-2-propenoyl isocyanate, 4-(2-(meth)acryloyloxyethoxycarbonylamino) phenylisocyanate, allyl 2-isocyanatoethylether, and 3-isocyanato-1-propene, 3-isocyanato-1-propyne, 3-isopropenyl-α,α-dimethylbenzyl isocyanate.

The above reaction schemes depict preparing a monomer comprising a single heterocyclic ring comprising an imide group and α, β-unsaturated carbonyl.

In other embodiments, the cyclic imide monomer comprises at least two cyclic imide groups. One suitable method for preparing a cyclic bis-imide monomer comprises reacting a dicarboxylic acid comprising an α, β-unsaturated carbonyl with a dehydrating agent forming a cyclic compound comprising an anhydride group and an α, β-unsaturated carbonyl (as previously described in Reaction Scheme 4); and reacting the anhydride group with a diamine. A representative reaction scheme is as follows:

Reaction Scheme 7

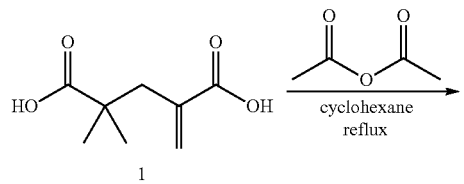

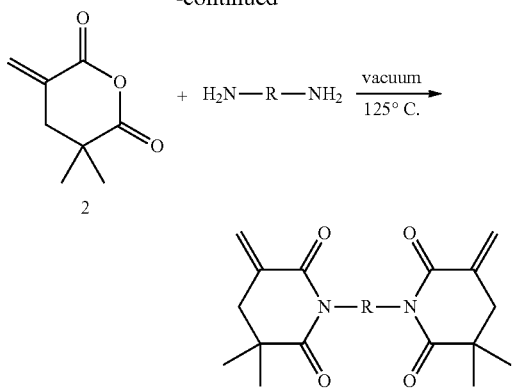

In some embodiments, the diamine is an aliphatic diamine where the amine groups are bonded with an alkylene linking group. In some embodiments, the alkylene linking group comprising 2 to 12 carbon atoms. The alkylene linking group may comprise straight-chain, branched, or cyclic moieties as well as a combination thereof. Suitable examples include ethylene diamine, 1,3-propanediamine, 1,2-propanediamine, 1,4-butanediamine, 1,2-butanediamine, 1,3-butanediamine, 1,5-pentanediamine, 1,2-pentanediamine, 1,3-pentanediamine, 1,4-pentanediamine, 2,4-pentanediamine, 1,6-hexanediamine, 1,7-heptanediamine, 1,8-octanediamine, 1,9-nonanediamine, 1,10-decanediamine, 1,12-dodecanediamine, isophorone diamine (cis and trans 5-amino-1,3,3-trimethylcyclohexanemethylamine), 1,5-diamino-2-methylpentane, trans-1,2-diaminocyclohexane, cis-1,2-diaminocyclohexane, 1,2-diphenyl-1,2-ethylenediamine, 4,4'-methylenebis(cyclohexylamine), and 4,4'-methylenebis(2-methylcyclohexylamine).

In other embodiments, the diamine is an aromatic diamine wherein the amine groups are bonded with a linking group comprising an arylene moiety. The linking group typically comprises a C6 to C12 arylene group. Suitable examples include p-phenylenediamine, o-phenylenediamine, m-phenylenediamine, 4,4'-diaminobiphenyl, 4,4'-methylenedianiline.

In another embodiment, the diamine may further comprise one or more pendent reactive (e.g. hydroxyl or carboxylic acid) groups. The pendent reactive (e.g. hydroxyl group) can be reacted with a compound comprising a coreactive group and a (e.g. free-radically polymerizable) ethylenically unsaturated group, such as an isocyanoalkyl (meth)acrylate or acid reactive (meth)acrylate as previously described. Representative reaction schemes are as follows:

Reaction Scheme 8

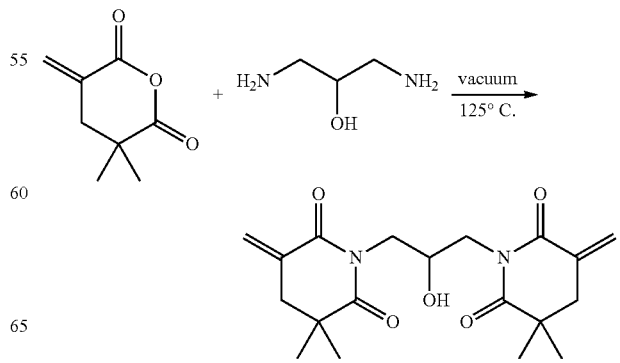

Reaction Scheme 9

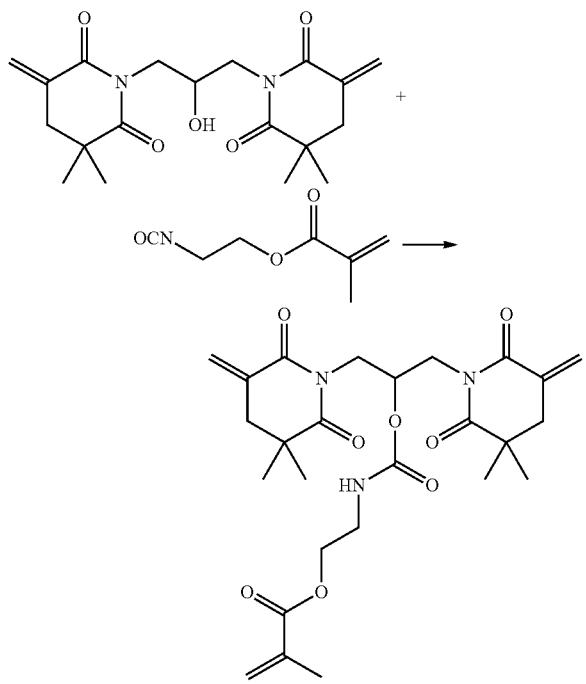

Although Reaction Schemes 4-6 are depicted with a specific 6-membered cyclic imide monomer, other cyclic imide monomers comprising at least 6 covalently bonded atoms and an α,β-unsaturation could be prepare using other dicarboxylic acids comprising an α, β3-unsaturated carbonyl.

The (e.g. polymerizable or polymerized) adhesive composition comprises at least one cyclic imide monomer, as described herein. In some embodiments, the cyclic imide monomer may be characterized as an addition-fragmentation monomer that can reduce polymerization induced stress. The polymerizable adhesive composition may have a single cyclic imide monomer, a combination of two or more cyclic imide monomers, or at least one cyclic imide monomer in combination with a different (e.g. addition-fragmentation) monomer, such as described in WO2012/112304; incorporated herein by reference.

In other embodiments, the cyclic imide monomer may be characterized as an adhesion-promoting agent. The adhesion-promoting cyclic imide may comprise an α, β-unsaturated carbonyl as previously described or the adhesion-promoting agent may have an α, β-unsaturated carbonyl having a different structure.

In some embodiments, the cyclic imide monomer with a (meth)acrylate group may have the formula $H_2C=CR^3—(C=O)-D-G$ wherein $R^3$ is hydrogen or methyl;

C=O is the unsaturated carbonyl;

D is a divalent linking group comprising an alkylene or substituted alkylene group with 1-24 carbon atoms; and G is cyclic imide or substituted cyclic imide group (such as cyclohexadienyl carboximide). In some embodiments, the cyclic imide monomer has the structure

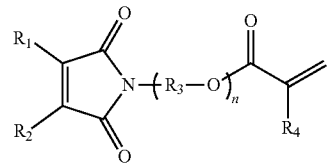

wherein $R_1$ and $R_2$ are independently hydrogen, a C1-C4 alkyl group, or $R_1$ and $R_2$ represent an unsaturated or saturated hydrocarbon group of a 5- or 6-membered ring; $R_3$ is the divalent linking group D, as previously described; and $R_4$ is hydrogen or methyl. In some embodiments, $R_3$ is a straight-chain or branched alkylene group having at least 1 or 2 and typically no greater than 6, 5, or 4 carbon atoms.

One representative compound has the structure:

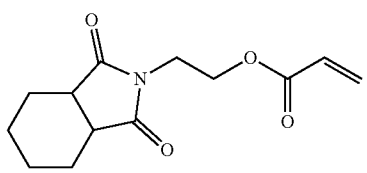 [SMILES: C=CC(=O)OCCN1C(=O)C2CCCCC2C1=O]

Cyclic imide monomers including those with (meth) acrylate groups are described in the literature and are also available from Miwon.

The (e.g. polymerizable or polymerized) adhesive composition typically comprises cyclic imide monomer(s), as described herein monomer(s) in an amount of at least 0.005, 0.006, 0.007, 0.008, 0.009, or 0.01, wt. %, based on the total weight of polymerizable monomer(s), oligomer(s), and polymer(s). In some embodiments, the amount of cyclic imide monomer(s) is at least 0.5, 1.0, 1.5, 2.0, 2.5, 3.0, or 3.5 wt. %, based on the total weight of polymerizable monomer(s), oligomer(s), and polymer(s). The amount of cyclic imide monomer(s) is typically no greater than 10 wt. %, based on the total weight of polymerizable monomer(s), oligomer(s), and polymer(s). In some embodiments, the amount of cyclic imide monomer(s) is typically no greater than 9, 8, 7, 6, 5, 4, 3, 2, 1, or 0.5 wt. %, based on the total weight of polymerizable monomer(s), oligomer(s), and polymer(s). It is appreciated that when the polymerizable adhesive is polymerized, the amount of cyclic imide monomer(s) is based on the total weight of the polymerized composition or in other words polymer. Typically, the (e.g. polymerizable or polymerized) composition comprises the minimum amount of cyclic imide monomer(s) that provides the desired technical benefit including reducing or eliminates the polymerization-based stress and/or increasing adhesion. Excess cyclic imide monomer(s) can reduce the mechanical properties of the polymerized composition.

In some embodiments, the polymerizable adhesive composition comprises at least one cyclic imide monomer, as described herein and at least one (e.g. free-radically) polymerizable monomer, oligomer, polymer, or combination thereof. The polymerizable monomer, oligomer, polymer, or combination thereof comprise the same (e.g. free radically) polymerizable ethylenically unsaturated groups as previously described for the cyclic imide monomers. Thus, the free-radically polymerizable ethylenically unsaturated groups group may include (meth)acrylate, carboxylic acid, (meth)acrylamide, vinyl, styrenic, or ethynyl.

The ethylenically unsaturated monomers are typically stable liquids at about 25° C. meaning that the monomers do not substantially polymerize, crystallize, or otherwise solidify when stored at room temperature (about 25° C.) for a typical shelf life of at least 30, 60, or 90 days. The viscosity of the monomers typically does not change (e.g. increase) by more than 10% of the initial viscosity. The polymerizable composition may further comprise ethylenically unsaturated monomer(s), oligomer, or polymers that are solid or semi-solids at 25° C. and can be dissolved in one or more polymerizable liquids (e.g. monomer(s)).

As used herein the term monomer refers to a compound. Monomers of the polymerizable composition that are different monomers than the cyclic imide monomers typically have a molecular weight no greater than 2000, 1500, 1000, or 500 g/mol. Oligomers comprise repeating units and have a molecular weight greater than the repeat (e.g. polymerized monomer) unit. Oligomers typically have a number average or weight average molecular weight no greater than 10,000 g/mole. Polymers have a greater number of polymerized (e.g. repeating) units than oligomers. Polymers typically have a number average or weight average molecular weight greater than 10,000 g/mole. Polymers included as a component of a polymerizable composition are soluble in the other monomers and/or oligomer of the polymerizable composition. Further, polymers included as component of a polymerizable composition typically have a weight average molecular weight or number average molecular weight of less than 100,000; 75,000, or 50,000 g/mole.

In some embodiments, the polymerizable adhesive composition comprises one or more lower molecular weight (e.g. free-radically polymerizable) ethylenically unsaturated monomers. Lower molecular weight monomers, especially non-cyclic monomers (e.g. illustrated by 2-hydroxyethyl methacrylate (HEMA) and/or methyl methacrylate (MMA)) often exhibit the greatest amount of volume shrinkage and polymerization induced stress.

In other embodiments, the polymerizable adhesive composition comprises one or more (e.g. free-radically polymerizable) ethylenically unsaturated cyclic monomers. The cyclic monomers together with the cyclic imide monomer, as described herein, provide a reduction in polymerization induced stress.

A reduction is polymerization induced stressed can be demonstrated by a reduction in Watts Deflection (as further described in the forthcoming examples). In some embodiments, the reduction in Watts Deflection is at least 0.01, 0.02, 0.03, 0.04, 0.05, 0.06, 0.07, 0.08, 0.09 or 0.10 mm, as compared to the same composition lacking the described cyclic imide monomer.

The volume shrinkage and polymerization stress of the cured polymerizable composition can be detected with various methods, some of which are described in WO2012/112304.

In other embodiments, the polymerizable adhesive composition comprises one or more (e.g. free-radically polymerizable) ethylenically unsaturated cyclic monomers (e.g. isobornyl methacrylate (IBOMA)) and/or an ethylenically unsaturated monomer bearing a longer chain hydrocarbon group (e.g. isostearyl acrylate (ISTA)). The cyclic imide monomers, described herein, can improve the adhesion of the polymerizable adhesive composition, as demonstrated by the Crosshatch Adhesion. In some embodiments, the crosshatch adhesion to glass, aluminum, and/or polycarbonate is at least 1B, 2B, 3B, or 4B.

The technical effect of the cyclic imide monomer improving adhesion is surmised applicable to a wide variety of adhesive compositions comprising various polymerized monomers, or in other words polymers, including natural or synthetic rubber, vinyl alkyl ether, silicone (e.g. polydimethylsiloxane), polyester, polyamide, polyolefins, polyurethane, and styrenic block copolymers. The adhesives may be organic solvent-based, water-based emulsions, or 100% solids, such as hot melts. In this embodiment, the cyclic imide polymer may or may not be copolymerized into the polymer of the adhesive composition. Thus, the cyclic imide monomer may be present as an unpolymerized monomer in the adhesive composition.

A variety of (e.g. free-radically) polymerizable monomers, oligomers, and polymers can be utilized in an adhesive composition. Typical monomers for acrylic structural adhesive include high Tg monomers, low Tg monomers optionally in combination with one or more other monomers such as acid-functional ethylenically unsaturated monomers, non-acid-functional polar monomers, and vinyl monomers. The cyclic imide monomer comprising the unsaturated carbonyl is typically copolymerized with the other ethylenically unsaturated monomers of the adhesive composition. However, for promoting adhesion it is also surmised that the cyclic imide monomer comprising the unsaturated carbonyl can be added to the (e.g. acrylic) adhesive after polymerizing the other ethylenically unsaturated monomers of the (e.g. acrylic) adhesive.

In some embodiments, the adhesive composition may be characterized as an acrylic (e.g. structural) adhesive. Acrylic (e.g. structural) adhesives typically have a glass transition temperature of at least 25, 30, 35, 40, 45 or 50° C. or greater. In other embodiments, the adhesive composition may be characterized as a pressure sensitive adhesive, having a glass transition temperature of less than 25 or 0° C. The Tg of the adhesive composition can be estimated by use of the Fox equation, based on the glass transition temperatures of homopolymers of the constituent monomers and the weight percent thereof.

The storage modulus (G') of a polymerized pressure sensitive adhesive obtained utilizing dynamic mechanical analysis at the application temperature, typically room temperature (e.g. 25° C.), is less than $3\times10^5$ Pa at a frequency of 1 Hz. The storage modulus (G') of a polymerized structural adhesive is considerably greater than $3\times10^5$ Pa at a frequency of 1 Hz.

In other embodiments, the adhesive composition may be characterized as an epoxy (e.g. structural) adhesive. Epoxy structural adhesives also have a relatively high glass transition temperature and storage modulus, as previously described for the acrylic structural adhesive.

In some embodiments, the polymerizable adhesive composition comprises one or more low Tg monomers, having a Tg no greater than 10° C. when the monomer is polymerized (i.e. independently) to form a homopolymer. In some embodiments, the low Tg monomers have a Tg no greater than 0° C., no greater than –5° C., or no greater than –10° C. when reacted to form a homopolymer. The Tg of these homopolymers is often greater than or equal to –80° C., greater than or equal to –70° C., greater than or equal to –60° C., or greater than or equal to –50° C. The Tg of these homopolymers can be, for example, in the range of –80° C. to 20° C., –70° C. to 10° C., –60° C. to 0° C., or –60° C. to –10° C.

The low Tg monomer may have the formula:

wherein $R_1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

In some embodiments, polymerizable adhesive composition comprises at least one low Tg monomer having a non-cyclic alkyl (meth)acrylate monomer(s) having 4 to 20 carbon atoms. In some embodiments, the (e.g. polymerizable) adhesive composition comprises at least one low Tg monomer having a (e.g. branched) alkyl group with 6 to 20 carbon atoms. In some embodiments, the low Tg monomer has an (e.g. branched) alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth)acrylate, butyl diglycol methacrylate, ethyltriglycol methacrylate, and lauryl (meth)acrylate. In some embodiments, the low Tg monomer may be a urethane methacrylate monomer, such as UDMA, further described in the examples.

In some embodiments, the polymerizable adhesive composition comprises a high Tg monomer, having a Tg greater than 25, 30, 35, 40, 45, or 50° C., or greater. Suitable high Tg alkyl (meth)acrylate monomers include, for example, t-butyl acrylate, methyl methacrylate, ethyl methacrylate, isopropyl methacrylate, isobutyl methacrylate, s-butyl methacrylate, t-butyl methacrylate, stearyl methacrylate, phenyl methacrylate, phenoxyethyl acrylate, cyclohexyl methacrylate, isobornyl acrylate, isobornyl methacrylate, norbornyl (meth)acrylate, benzyl methacrylate, 3,3,5 trimethylcyclohexyl (meth)acrylate, cyclohexyl acrylate, N-octyl acrylamide, and propyl methacrylate, or combinations.

In some embodiments, the polymerizable adhesive composition comprises a (e.g. free-radically polymerizable) ethylenically unsaturated monomer(s) comprising a branched (e.g. terminal) alkyl group with at least 7 carbon atoms can be represented by the following formula:

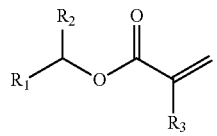

wherein:
R$^1$ and R$^2$ are each independently a C$_1$ to C$_{30}$ saturated linear alkyl group (it will be understood that in this formula R$^1$ and R$^2$ are not joined together to form a ring);
the sum of the number of carbons in R$^1$ and R$^2$ is 7 to 31; and
R$^3$ is H or CH$_3$.

In some embodiments, the sum of the number of carbons in R$^1$ and R$^2$ is at least 18. When the sum of the number of carbons in R$^1$ and R$^2$ is 18, the monomer may be described as isostearyl acrylate or isooctadecyl acrylate. As used herein the prefix "iso-" refers to an isomer with the same molecular formula, but with one or more different (e.g. branched, non-linear) structures.

In some embodiments, the ethylenically unsaturated monomer(s) comprising a branched (e.g. terminal) alkyl group with at least 7 carbon atoms is an isomer where all the carbons except one form a continuous chain. Such isomer has an isopropyl group at the end of the chain. For example, the term "isostearyl acrylate" has also been used to describe the following compound:

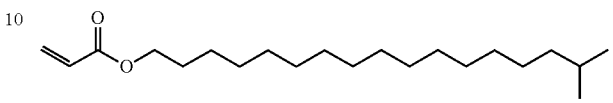

In other embodiments, the release coating comprises a mixture of at least two isomers. For example, the term "isostearyl acrylate" has been used to describe the following mixture of compounds:

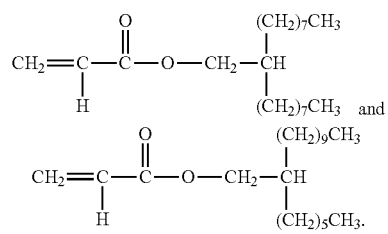

Polymerized high Tg alkyl (meth)acrylate monomers are typically present in the polymerized structural adhesive composition in an amount of at least 50, 55, 60, 65, 75, 80, 85, 90 or 95 wt. %, based on the total amount of polymerizable organic components of the adhesive composition. Pressure sensitive adhesive compositions typically comprise lower amounts of high Tg alkyl (meth)acrylate monomers.

Polymerized low Tg alkyl (meth)acrylate monomers are typically present in the polymerized pressure sensitive adhesive composition in an amount of at least 50, 55, 60, 65, 75, 80, 85, 90, or 95 wt. % based on the total amount of polymerizable organic components of the adhesive composition. Structural adhesive compositions typically comprise lower amounts of low Tg alkyl (meth)acrylate monomers. In some embodiments, the structural adhesive composition comprises at least 5, 10, 15, 20, or 25 wt. % of low Tg monomers.

The polymerizable adhesive composition may optionally comprise an acid functional monomer, where the acid functional group may be an acid per se, such as a carboxylic acid, or a portion may be salt thereof, such as an alkali metal carboxylate. Useful acid functional monomers include, but are not limited to, ethylenically unsaturated carboxylic acids, ethylenically unsaturated sulfonic acids, ethylenically unsaturated phosphonic acids, ethylenically unsaturated phosphoric acids and combinations thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and combinations thereof.

Acid functional monomers are typically ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomers may be present in an amount of 0 or at least 0.5 and no greater than 15, 10 or 5 wt. % based on the total weight of polymerizable or polymerized organic components of the adhesive composition.

The polymerizable adhesive composition may optionally comprise other monomers such as a non-acid-functional polar monomer.

Representative examples of suitable polar monomers include but are not limited to 2-hydroxyethyl (meth)acrylate; tetrahydrofurfuryl acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates, including 2-(2-ethoxyethoxy)ethyl (meth)acrylate, 2-ethoxyethyl (meth)acrylate, 2-methoxyethoxyethyl (meth) acrylate, 2-methoxyethyl methacrylate, polyethylene glycol mono(meth)acrylates; alkyl vinyl ethers, including vinyl methyl ether; and mixtures thereof. In some embodiments, the polar groups comprise hydroxyl, ether, or amide groups. The non-acid-functional polar monomer may be present in an amount of zero or at least 0.5, 1, 2, 3, 5, 6, 7, 8, 9, or 10 wt. % ranging up to 15 or 20 or 30 or 40 wt. % of polymerizable or polymerized organic components of the adhesive composition.

Inclusion of acid functional monomers or non-acid functional polar monomers can also function as an adhesion promoter.

The polymerizable adhesive composition may optionally comprise vinyl monomers such as vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Vinyl monomers may be present in an amount of 0 or at least 0.5 or 1 wt. % ranging up 5 wt. %, based on the total polymerizable or polymerized organic components of the adhesive composition.

Oligomeric (meth)acryl monomers such as, for example, urethane (meth)acrylates, polyester (meth)acrylates, and epoxy (meth)acrylates can also be employed.

Suitable urethane (meth)acrylate oligomer(s) may include aromatic urethane acrylates, aliphatic urethane acrylates, aromatic/aliphatic urethane acrylates and combinations thereof. Many urethane (meth)acrylate oligomer(s) are available commercially. Suitable examples of urethane (meth)acrylate oligomer(s) may be obtained from Arkema, King of Prussia, Pennsylvania, and marketed as CN1964 (aliphatic urethane dimethacrylate), CN1968 (low viscosity urethane methacrylate oligomer), CN310 (urethane acrylate oligomer), CN996 (aromatic polyester-based urethane diacrylate oligomer); SOLTECH LTD., Yangsan, South Korea, and marketed as SUA5371 (difunctional aliphatic urethane acrylate oligomer); Nippon Soda Co. Ltd., Chiyoda, Japan, and marketed as TE-2000 (polybutadiene urethane methacrylate), TEAI-1000 (polybutadiene urethane acrylate); Dymax, Torrington, Connecticut, and marketed as BR-3747AE (aliphatic polyether urethane acrylate), BRC-843S (hydrophobic urethane acrylate), BR640D (polybutadiene urethane acrylate), and combinations thereof. Other suitable urethane (meth)acrylate oligomer(s) may be prepared by the reaction of (i) a polyisocyanate and a hydroxy-functional (meth)acrylate, and/or (ii) a polyisocyanate, a polyol, and a hydroxy-functional (meth)acrylate. In some examples, the urethane (meth)acrylate is a reaction product of one or more polyisocyanate(s), one or more polyol(s), and one or more hydroxy-functional (meth)acrylate(s).

In some embodiments, the polymerizable adhesive composition may comprise a (e.g. free-radically polymerizable) ethylenically unsaturated polymer such as a (meth)acrylic polymer or urethane(meth)acrylate polymer.

Such (meth)acrylate monomers and oligomers are widely available from vendors such as, for example, Sartomer Company of Exton, Pennsylvania; Allnex USA Inc. (Alpharetta, Georgia) and MilliporeSigma of Burlington, Massachusetts.

The polymerizable adhesive composition may optionally comprise a crosslinker. Suitable crosslinkers include for example multi (meth)acrylate monomers and oligomers. When utilized, the amount of crosslinker is typically present in an amount of at least 0.01 to 40 parts by weight, 0.1 to 30 parts by weight, or even 3 to 15 parts by weight, relative to 100 parts by weight of the composition.

Useful multi-(meth)acrylate monomers and oligomers include:

(a) di(meth)acryl containing monomers such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containing monomer such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

In some embodiments, the multi-acrylate monomers and oligomers just described are also available as methacrylates.

In some embodiments, the polymerizable (e.g. adhesive) composition comprises a (meth)acrylate monomer comprising at least three (meth)acrylate functional groups. In some embodiments, the monomer comprises at least four, five, or six (meth)acrylate functional groups. Such monomers are also referred to as crosslinking agents. In some embodiments, (meth)acrylate functional groups tend to be favored over acrylate functional groups.

Commercially available crosslinking agents include for example trimethylolpropane triacrylate (commercially available from Sartomer Company, Exton, PA under the trade designation "SR351"), ethoxylated trimethylolpropane triacrylate (commercially available from Sartomer Company, Exton, PA under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494"), dipentaerythritol hexaacrylate, and tris(2-hydroxy ethyl) isocyanurate triacrylate (from Sartomer under the trade designation "SR368".

In some embodiments, the polymerizable adhesive composition may include ethylenically unsaturated monomers having a refractive index of at least 1.50. In some embodiments, the refractive index is at least 1.51, 1.52, 1.53, or greater. The inclusion of sulfur atoms and/or the present of one or more aromatic moieties can raise the refractive index (relative to the same molecular weight monomer lacking such substituents). The polymerizable adhesive composition may also have a high refractive index as just described, by inclusion of high refractive ethylenically unsaturated monomers and/or high refractive index particles, such as nanoparticles.

In some embodiments, the polymerizable adhesive composition may comprise an epoxy resin. Useful epoxy resins or epoxides comprises at least one oxirane ring that is polymerizable by ring opening, i.e., an average epoxy functionality greater than one, and preferably at least two. The epoxides can be monomeric or polymeric, and aliphatic, cycloaliphatic, heterocyclic, aromatic, hydrogenated, or combinations thereof. Preferred epoxides contain more than 1.5 epoxy group per molecule and preferably at least 2 epoxy groups per molecule. The useful materials typically have a weight average molecular weight of about 150 to about 10,000, and more typically of about 180 to about 1,000. The molecular weight of the epoxy resin is usually selected to provide the desired properties of the cured composition. Suitable epoxy resins include linear polymeric epoxides having terminal epoxy groups (e.g., a diglycidyl ether of a polyoxyalkylene glycol), polymeric epoxides having skeletal epoxy groups (e.g., polybutadiene poly epoxy), and polymeric epoxides having pendent epoxy groups (e.g., a glycidyl methacrylate polymer or copolymer), and mixtures thereof. The epoxide-containing materials include compounds having the general formula:

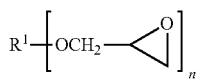

where $R^1$ is an alkyl, alkyl ether, or aryl, and n is 1 to 6.

These epoxy resins include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

Other epoxy resins that are useful include the cycloaliphatic epoxies such as cyclohexene oxide, the cycloaliphatic epoxies under the trade designation CELLOXIDE from Daicel USA Inc., Fort Lee, NJ, and those under the trade designation SYNA from Synasia Inc. Metuchen, NJ. Examples include vinylcyclohexene oxide, vinylcyclohexene dioxide, 3,4-epoxycyclohexylmethyl-3,4-epoxycyclohexane carboxylate, and bis-(3,4-epoxycyclohexyl) adipate.

Also useful are polyhydric phenolic formaldehyde condensation products as well as polyglycidyl ethers that contain as reactive groups only epoxy groups or hydroxy groups. Useful curable epoxy resins are also described in various publications including, for example, "Handbook of Epoxy Resins" by Lee and Nevill, McGraw-Hill Book Co., New York (1967), and Encyclopedia of Polymer Science and Technology, 6, p. 322 (1986).

The choice of the epoxy resin used depends upon the end use for which it is intended. Epoxides with flexibilized backbones may be desired where a greater amount of ductility is needed in the bond line. In some embodiments, the composition is suitable for use as a structural adhesive. Materials such as diglycidyl ethers of bisphenol A and diglycidyl ethers of bisphenol F can provide desirable structural adhesive properties that these materials attain upon curing, while hydrogenated versions of these epoxies may be useful for compatibility with substrates having oily surfaces.

Examples of commercially available epoxides useful in the present disclosure include diglycidyl ethers of bisphenol A (e.g., those available under the trade designations EPON 828, EPON 1001, EPON 1004, EPON 2004, EPON 1510, and EPON 1310 from Momentive Specialty Chemicals, Inc., and those under the trade designations D.E.R. 331, D.E.R. 332, D.E.R. 334, and D.E.N. 439 available from Dow Chemical Co.); diglycidyl ethers of bisphenol F (e.g., that are available under the trade designation ARALDITE GY 281 available from Huntsman Corporation); silicone resins containing diglycidyl epoxy functionality; flame retardant epoxy resins (e.g., that are available under the trade designation DER 560, a brominated bisphenol type epoxy resin available from Dow Chemical Co.); aliphatic epoxides (e.g., that are available under the trade designation CELLOXIDE 2021P available from Daicel Corporation); and 1,4-butanediol diglycidyl ethers.

Epoxy-containing compounds having at least one glycidyl ether terminal portion, and preferably, a saturated or unsaturated cyclic backbone may optionally be added to the composition as reactive diluents. Reactive diluents may be added for various purposes such as to aid in processing, e.g., to control the viscosity in the composition as well as during curing, to flexibilize the cured composition, and to compatibilize materials in the composition.

Examples of such diluents include: diglycidyl ether of cyclohexanedimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N'N'-tetraglycidyl meta-xylylene diamine, and vegetable oil polyglycidyl ether. Reactive diluents are commercially available under the trade designation HELOXY and CARDURA from Momentive Specialty Chemicals, Inc. The composition may contain a toughening agent to aid in providing the desired overlap shear, peel resistance, and impact strength.

The (e.g. adhesive) composition desirably contains one or more epoxy resins having an epoxy equivalent weight of at least 100, 200 or 300 and typically no greater than 1500, 1200, or 1000. In some embodiments, the adhesive contains two or more epoxy resins, wherein at least one epoxy resin has an epoxy equivalent weight of from about 300 to about 500, and at least one epoxy resin has an epoxy equivalent weight of from about 1000 to about 1200.

In some embodiments, the (e.g. structural) adhesive composition comprises one or more epoxy resins in an amount of at least 20, 25 or 30 wt. % and typically no greater than 95, 90, 85, 80, 75, or 70 wt. % of the unfilled (e.g. adhesive) composition or in other words the total amount of organic components except for organic polymeric fillers.

In some embodiments, the (e.g. epoxy-resin-containing) adhesive composition further comprises a liquid (at 25° C.) hydroxy-functional polyol.

Examples include polyalkylene oxide polyols such as polyoxyethylene and polyoxypropylene glycols; polyoxyethylene and polyoxypropylene triols and polytetramethylene oxide glycols. Such polyols can be suitable for retarding the curing reaction so that the "open time" of the adhesive composition can be increased.

Commercially available hydroxy-functional poly(alkylenoxy) compounds suitable for use in the present invention include, but are not limited to, the POLYMEG series of polytetramethylene oxide glycols (available from Lyondellbasell, Inc., Jackson, Tenn.), the TERATHANE™ series of polytetramethylene oxide glycols (from Invista, Newark, Del.); the POLYTHF™ series of polytetramethylene oxide glycol from BASF Corp. (Charlotte, N.C.); the ARCOL™ series of polyoxypropylene polyols (from Covestro, Pittsburgh, PA) and the VORANOL™ series of polyether polyols from Dow Automotive Systems, Auburn Hills, MI.

In some embodiments, the adhesive composition comprises at least 5 or 10 wt. % and no greater than 45, 40, 35, 30, 25 or 20 wt. % of liquid (at 25° C.) hydroxy-functional polyol(s).

In some embodiments, the adhesive composition comprises an epoxy resin in combination with a (meth)acrylic polymer. For example the (meth)acrylic polymer may be a copolymer of tetrahydrofurfuryl (meth)acrylate and a $C_1$-$C_8$ alkyl (meth)acrylate ester monomer; as described in U.S. Pat. No. 10,676,655; incorporated herein by reference. Useful monomers include the acrylates and methacrylates of methyl, ethyl, propyl, isopropyl, butyl, pentyl, hexyl, heptyl and octyl alcohols, including all isomers, and mixtures thereof. In some embodiments, the alcohol is selected from $C_3$-$C_6$ alkanols. In some embodiments, at least two $C_1$-$C_8$ alkyl (meth)acrylate ester monomers are utilized wherein in one is a low Tg monomer such as butyl acrylate or octyl acrylate and one is a higher Tg cyclic alkyl (meth)acrylate ester monomer, such as isobornyl acrylate or t-butyl cyclohexyl acrylate.

In one embodiment, the (meth)acrylic polymer may comprise polymerized units of:
a) 10-60 wt. % of (e.g. tetrahydrofurfuryl) (meth)acrylate
b) 40-85 wt. % of $C_1$-$C_8$ alkyl (meth)acrylate ester monomers;
c) 0 to 50 wt. % of cationically reactive functional monomers;
wherein the sum of a)-c) is 100 wt. %.

The copolymer may contain polymerized units of a cationically reactive monomer, such as glycidyl acrylate, glycidyl methacrylate, hydroxyethyl acrylate, hydroxyethyl methacrylate, hydroxypropyl methylacrylate, hydroxybutyl acrylate, hydroxypropyl acrylate, and alkoxysilylalkyl (meth)acrylate, such as trimethoxysilylpropyl acrylate.

In some embodiments, the amount of c) is at least 5, 10, 15, or 20 wt. % of the (meth)acrylic polymer. In some embodiments, the amount of c) is no greater than 45, 40, 35, 30, 25 or 20 wt. % of the (meth)acrylic polymer. When the copolymer is combined with an epoxy resin, it typically does not contain any acrylic monomers having moieties sufficiently basic so as to inhibit cationic cure of the adhesive composition.

In some embodiments, the polymerizable composition comprises an epoxy resin in combination with the previously described ethylenically unsaturated (e.g. (meth)acrylate) monomer(s) and/or oligomer(s). In some embodiments, the polymerizable composition comprises at least 5 or 10 wt. % and no greater than 30, 25, or 20 wt. % of an epoxy resin and at least 20, 25, 30, 35, 40, or 45 wt. % and no greater than 60, 55, or 50 wt. % of ethylenically unsaturated (e.g. (meth)acrylate) monomer(s) and/or oligomer(s). The ethylenically unsaturated monomers may include high Tg monomer(s) and crosslinker(s), as previously described. In some embodiments, the high Tg monomer(s) and crosslinker(s) are present at a weight ratio ranging from 1.5:1 to 1:1.5. The polymerizable composition may further comprise a hydroxyl-functional component inclusive of polyols in an amount as previously described.

The cationic cure of the epoxy resin is typically achieved by the addition of acid, addition of a photoacid generator and exposing the composition to (e.g. ultraviolet) actinic radiation, or addition of a thermal acid generator and exposing the composition to a sufficient heat to activate the thermal acid generator.

Photoacid generators are generally known, and reference may be made to K. Dietliker, Chemistry and Technology of UV and EB Formulation for Coatings, Inks and Paints, vol. III, SITA Technology Ltd., London, 1991, which is hereby incorporated by reference. Further reference may be made to Crivello J. V. (1984) Cationic polymerization—Iodonium and sulfonium salt photoinitiators. In: Initiators Poly-Reactions—Optical Activity. Advances in Polymer Science, vol 62. Springer, Berlin, Heidelberg, which is also hereby incorporated by reference Useful sulfonium salt photoacid generators include, but are not limited to: diphenyl(4-phenylthio)phenyl sulfonium hexafluorophosphate, bis(4-diphenylsulfonium phenyl)sulfide bis-(hexafluorophosphate), diphenyl(4-phenylthio)phenyl sulfonium hexafluoroantimonate, bis(4-diphenylsulfonium phenyl)sulfide bis-(hexafluoroantimonate), and blends of these triarylsulfonium salts available from Synasia, Metuchen, N.J. under the trade designations of UVI-6992™ and UVI-6976™ for the PF6 and SbF6 salts, respectively. Other useful sulfonium salt include, but are not limited to: triphenyl sulfonium hexafluoroantimonate (e.g., CT-548™ from Chitec Technology Corp. Taipei, Taiwan), diphenyl(4-phenylthio)phenyl sulfonium hexafluorophosphate (e.g., CPI-100 from San-Apro Limited, Tokyo Japan), and diphenyl(4-phenylthio)phenyl sulfonium [(Rf)nPF6-n], where Rf is a perfluorinated alkyl group (e.g., CPI-200 from San-Apro Limited, Tokyo Japan).

Useful iodonium salt photoacid generators include bis(4-t-butylphenyl) iodonium hexafluoroantimonate (FP5034 from Hampford Research Inc., Stratford, CT), bis(4-t-butylphenyl) iodonium hexafluorophosphate (FP5035 from Hampford Research Inc.), and (4-isopropylphenyl)(4-methylphenyl)iodonium tetrakis(pentafluorophenyl) borate (available as BLUESIL PI 2074 from Elkem Silicones, East Brunswick, NJ).

Useful classes of thermal acid generators can include, for example, alkylammonium salts of sulfonic acids, such as triethylammonium p-toluenesulfonate (TEAPTS). Another suitable class of TAGs is that disclosed in U.S. Pat. No. 6,627,384 (Kim, et al.), incorporated herein by reference.

Other classes of thermal acid generators are described in U.S. Pat. No. 7,514,202 (Ohsawa et al.) and U.S. Pat. No. 5,976,690 (Williams et al.); each incorporated herein by reference.

The (e.g. epoxy-containing) adhesive composition typically comprises one or more acid components that are preferably photoacid generators or thermal acid generators in an amount of at least 0.05 or 0.1 wt. % ranging up to 2, 3, 4, 5, 6, 7, 8, 9, or 10 wt. % of the total (e.g. unfilled) adhesive composition.

Without intending to be bound by theory, it is surmised that the cyclic imide monomer may react with the epoxy via one of the following reaction schemes:

In some embodiments, the (e.g. adhesive) composition comprises an organic and/or inorganic filler is an amount no greater than 10 wt. % of the total (e.g. adhesive) composition. In other embodiments, the amount of organic and/or inorganic filler is greater than 10, 15, 20, 25, 30, 25, 40, 45, or 50 wt. % of the total (e.g. adhesive) composition. The total amount of organic and/or inorganic filler is typically no greater than 75, 70, 65, 50, or 45 wt. % of the total (e.g. adhesive) composition. In some embodiments, the total amount of organic and/or inorganic filler is no greater than 35, 30, or 25 wt. % of the total (e.g. adhesive) composition.

Reaction Scheme 10

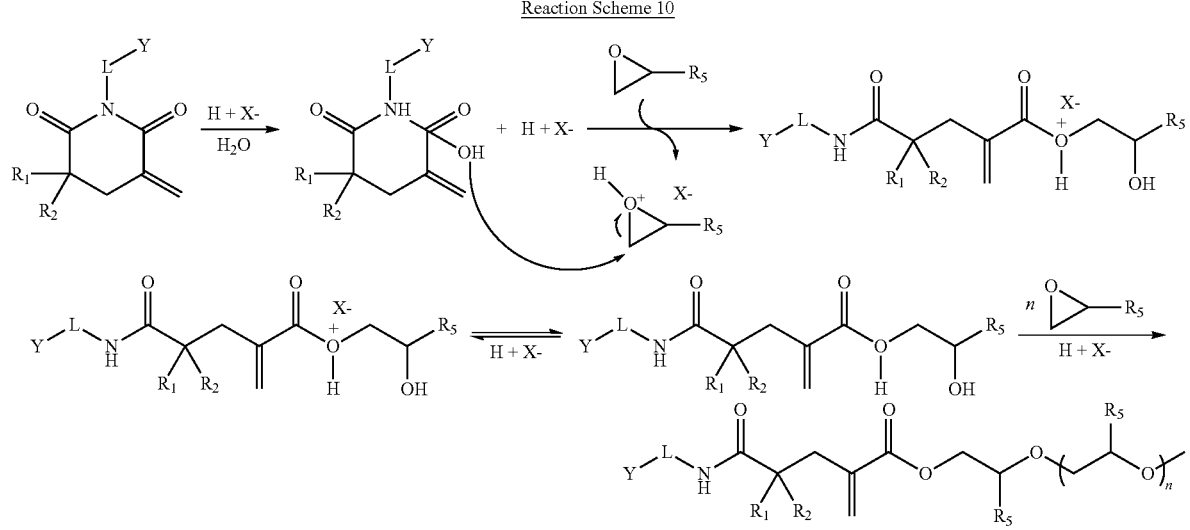

Reaction Scheme 11

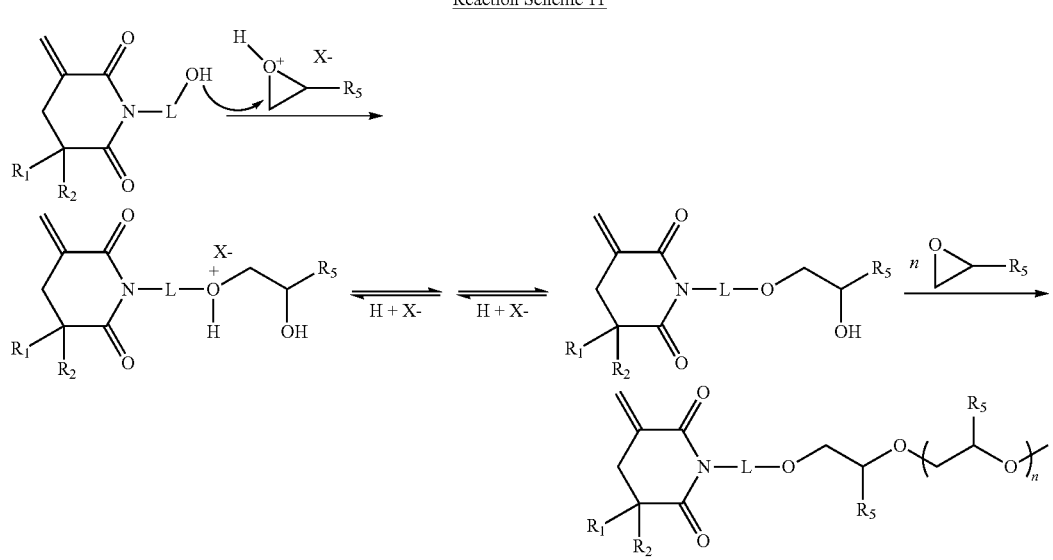

The (e.g. adhesive) compositions may optionally contain one or more conventional additives. Preferred additives include tackifiers, plasticizers, antioxidants, UV stabilizers, colorants (e.g. carbon black) and inorganic fillers such as (e.g. fumed) silica, (e.g. phlogopite) mica and glass and ceramic bubbles; as well as (e.g. polyolefin (e.g. polyethylene) organic polymeric filler and inorganic fibers.

In some embodiments, the filler comprises particles having various shapes such as spherical, ellipsoid, linear or branched.

In some embodiments, the filler particles typically have mean primary particle size of at least 1, 2, 3, 4, 5, 6, 7, 8, 9, or 10 microns. In some embodiments, the filler particles have a mean particle size less than 1 micron. In other embodiments, the filler particles have a mean primary particle size of at least 15, 20, 25, 30, 35, 40, 45, or 50 microns. The filler primary particle size is typically no greater than 250, 200, 150, or 100 microns. Smaller filler particles can be amenable to higher filler concentration. The filler particles may comprise a normal distribution of particle sizes having a single peak or a distribution of particles having two or more peaks. "Primary particle size" refers to the mean diameter of a single (non-aggregate, non-agglomerate) particle.

In other embodiments, the size of inorganic oxide particles can be chosen to avoid significant visible light scattering. The (e.g. adhesive) composition generally comprises a significant amount of surface modified inorganic oxide nanoparticles having an average (e.g. unassociated) primary particle size or associated particle size of at least 30, 40 or 50 nm and no greater than 1 micron, 500 nm, 250 nm, 200 nm, or 150 nm. In other embodiments, at least a portion of the inorganic oxide particle are micron sized rather than nanoparticle sized.

The average particle size of the inorganic oxide particles can be measured using transmission electron microscopy to count the number of inorganic oxide particles of a given diameter. The inorganic oxide particles can consist essentially of or consist of a single oxide such as silica, or can comprise a combination of oxides, or a core of an oxide of one type (or a core of a material other than a metal oxide) on which is deposited an oxide of another type. Silica is a common inorganic particle utilized in (e.g. adhesive) compositions. The inorganic oxide particles are often provided in the form of a sol containing a colloidal dispersion of inorganic oxide particles in liquid media. The sol can be prepared using a variety of techniques and in a variety of forms including hydrosols (where water serves as the liquid medium), organosols (where organic liquids so serve), and mixed sols (where the liquid medium contains both water and an organic liquid).

Aqueous colloidal silicas dispersions are commercially available from Nalco Chemical Co., Naperville, IL under the trade designation "Nalco Collodial Silicas" such as products 1040, 1042, 1050, 1060, 2327, 2329, and 2329K or Nissan Chemical America Corporation, Houston, TX under the trade designation SNOWTEX™. Organic dispersions of colloidal silicas are commercially available from Nissan Chemical under the trade name Organosilicasol. Suitable fumed silicas include for example, products commercially available from Evonik DeGussa Corp., (Parsippany, NJ) under the trade designation, "Aerosil series OX-50", as well as product numbers –130, –150, and –200. Fumed silicas are also commercially available from Cabot Corp., Tuscola, IL, under the trade designations "CAB-O-SPERSE 2095", "CAB-O-SPERSE A105", and "CAB-O-SIL M5".

It may be desirable to employ a mixture of inorganic oxide particle types to optimize an optical property, material property, or to lower that total composition cost.

As an alternative to or in combination with silica the (e.g. adhesive) composition may comprise various high refractive index inorganic nanoparticles. Such nanoparticles have a refractive index of at least 1.60, 1.65, 1.70, 1.75, 1.80, 1.85, 1.90, 1.95, 2.00 or higher. High refractive index inorganic nanoparticles include for example zirconia ("$ZrO_2$"), titania ("$TiO_2$"), antimony oxides, alumina, tin oxides, alone or in combination. Mixed metal oxide may also be employed.

Zirconias for use in the high refractive index layer are available from Nalco Chemical Co. under the trade designation "Nalco OOSSOO8", Buhler AG Uzwil, Switzerland under the trade designation "Buhler Zirconia Z-WO Sol" and Nissan Chemical America Corporation under the trade name NanoUse ZR™. Zirconia nanoparticles can also be prepared such as described in U.S. Patent Publication No. 2006/0148950 and U.S. Pat. No. 6,376,590. A nanoparticle dispersion that comprises a mixture of tin oxide and zirconia covered by antimony oxide (RI~1.9) is commercially available from Nissan Chemical America Corporation under the trade designation "HX-05M5". A tin oxide nanoparticle dispersion (RI~2.0) is commercially available from Nissan Chemicals Corp. under the trade designation "CX-S401M". Zirconia nanoparticles can also be prepared such as described in U.S. Pat. Nos. 7,241,437 and 6,376,590.

The inorganic particulate material is typically surface modified inorganic oxide particles that add mechanical strength and durability to the cured composition. The particles are typically substantially spherical in shape and relatively uniform in size. The particles can have a substantially monodisperse size distribution or a polymodal distribution obtained by blending two or more substantially monodisperse distributions. The inorganic oxide particles are typically non-aggregated (substantially discrete), as aggregation can result in precipitation of the inorganic oxide particles or gelation of the (e.g. adhesive) coating composition.

Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of their surface with a surface treatment agent so that the stabilized particle can copolymerize or react with the polymerizable resin during curing. The incorporation of surface modified inorganic particles is amenable to covalent bonding of the particles to the (e.g. free-radically polymerizable) ethylenically unsaturated organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes, and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. In some embodiments, silane surface treatments are reacted with the particle or nanoparticle surface before incorporation into the resin. The amount of surface modifier is dependent upon several factors such as particle size, particle type, modifier molecular weight and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hours, approximately. Surface treatment agents such as carboxylic acids may not require elevated temperatures or extended time.

In some embodiments, inorganic nanoparticle comprises at least one copolymerizable silane surface treatment. Suitable (meth)acryl organosilanes include for example (meth) acryloyl alkylene alkoxy silanes such as 3-(methacryloyloxy)-propyltrimethoxysilane, 3-acryloylxypropyltrimethoxysilane, 3-(methacryloyloxy)propylmethyldimethoxysilane, 3-(acryloyloxypropyl)methyl dimethoxysilane, 3-(methacryloyloxy)propyldimethylmethoxysilane, and 3-(acryloyloxypropyl) dimethylmethoxysilane. Suitable vinyl silanes include vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane. Suitable amino organosilanes are described for example in US2006/0147177.

The inorganic nanoparticle may further comprise various other surface treatments, as known in the art.

The (e.g. adhesive) composition may optionally comprise a silicone or fluorinated additive, which may be added to lower the surface energy of the composition.

The composition may be polymerized with a thermal initiator, or photoinitiator, or a cure initiator system, or a photoacid generator. In the case of free radical polymerizable compositions, any conventional free radical initiator may be used to generate the initial radical. Examples of suitable thermal initiators include peroxides such as benzoyl peroxide, dibenzoyl peroxide, dilauryl peroxide, cyclohexane peroxide, methyl ethyl ketone peroxide, hydroperoxides, e.g., tert-butyl hydroperoxide and cumene hydroperoxide, dicyclohexyl peroxydicarbonate, 2,2,-azo-bis (isobutyronitrile), and t-butyl perbenzoate. Examples of commercially available thermal initiators include initiators available from DuPont Specialty Chemical (Wilmington, Del.) under the VAZO trade designation including VAZO™ 67 (2,2'-azo-bis(2-methybutyronitrile)) VAZO 64 (2,2'-azo-bis(isobutyronitrile)) and VAZO™ 52 (2,2'-azo-bis(2,2-dimethyvaleronitrile)), and LUCIDOL 70 from Elf Atochem North America, Philadelphia, Pa.

Useful photoinitiators include benzoin ethers such as benzoin methyl ether and benzoin isopropyl ether; substituted acetophenones such as 2,2-dimethoxyacetophenone, available as IRGACURE 651 photoinitiator (Ciba Specialty Chemicals), 2,2 dimethoxy-2-phenyl-1-phenylethanone, available as ESACURE KB-1 photoinitiator (Sartomer Co.; West Chester, PA), and dimethoxyhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime.

Particularly preferred among these are the substituted acetophenones.

In some embodiments, the cure initiator system is a redox initiator system, as one-electron transfer redox reactions may be an effective method of generating free radicals under mild conditions. Redox initiator systems have been described, for example, in Prog. Polym. Sci. 24 (1999) 1149-1204.

In some embodiments, the redox initiator system is a blend of a peroxide with an amine, where the polymerization is initiated by the decomposition of the organic peroxide activated by the redox reaction with amine reducing agent. Typically, the peroxide is benzoyl peroxide, and the amine is a tertiary amine. Aromatic tertiary amines are the most effective compounds to generate the primary radicals, with N, N-dimethyl-4-toluidine ("DMT") being the most common amine reducing agent.

In some embodiments, the redox cure initiator system comprises a barbituric acid derivative and a metal salt. In some embodiments, the barbituric acid/metal salt cure initiator system may further comprise an organic peroxide, an ammonium chloride salt (e.g., benzyl tributylammonium chloride), or a combination thereof.

Examples of cure initiator systems based on barbituric acid include redox initiator systems having (i) a barbituric acid derivative and/or a malonyl sulfamide, and (ii) an organic peroxide, selected from the group consisting of the mono- or multifunctional carboxylic acid peroxide esters. Examples of barbituric acid derivatives include 1,3,5-trimethylbarbituric acid, 1,3,5-triethylbarbituric acid, 1,3-dimethyl-5-ethylbarbituric acid, 1,5-dimethylbarbituric acid, 1-methyl-5-ethylbarbituric acid, 1-methyl-5-propylbarbituric acid, 5-ethylbarbituric acid, 5-propylbarbituric acid, 5-butylbarbituric acid, 1-benzyl-5-phenylbarbituric acid, 1-cyclohexyl-5-ethylbarbituric acid and the thiobarbituric acids mentioned in the German patent application DE-A-42 19 700.

The barbituric acids and barbituric acid derivatives described in U.S. Pat. No. 3,347,954 (Bredereck et al.) and 9,957,408 (Thompson), as well as the malonyl sulfamides disclosed in the European patent specification EP-B-0 059 451, may be useful in embodiments of the present disclosure. Examples of malonyl sulfamides include 2,6-dimethyl-4-isobutylmalonyl sulfamide, 2,6-diisobutyl-4-propylmalonyl sulfamide, 2,6-dibutyl-4-propylmalonyl sulfamide, 2,6-dimethyl-4-ethylmalonyl sulfamide or 2,6-dioctyl-4-isobutylmalonyl sulfamide.

The barbituric acid-based redox initiator systems typically contain mono- or multifunctional carboxylic acid peroxyesters as organic peroxides. Carbonic peroxyesters are also included among the multifunctional carboxylic acid peroxyesters within the meaning of the present disclosure. Suitable examples include carbonic-diisopropyl-peroxydiester, neodecanoic acid-tertiary-butyl-peroxyester, neodecanoic acid-tertiary-amyl-peroxyester, maleic acid-tertiary-butyl-monoperoxyester, benzoic acid-tertiary-butyl-peroxyester, 2-ethylhexanoic acid-tertiary-butyl-peroxyester, 2-ethylhexanoic acid-tertiary-amyl-peroxyester, carbonic-monoisopropylester-monotertiary-butyl-peroxyester, carbonic-dicyclohexyl-peroxyester, carbonic dimyristyl-peroxyester, carbonic dicetyl peroxyester, carbonic-di(2-ethylhexyl)-peroxyester, carbonic-tertiary-butyl-peroxy-(2-ethylhexyl)ester or 3,5,5-trimethylhexanoic acid-tertiary-butyl-peroxyester, benzoic acid-tertiary-amyl-peroxyester, acetic acid-tertiary-butyl-peroxyester, carbonic-di(4-tertiary-butyl-cyclohexyl)-peroxyester, neodecanoic acid-cumene-peroxyester, pivalic acid-tertiary-amyl-peroxyester and pivalic acid tertiary-butyl-peroxyester.

In particular, carbonic-tertiary-butyl-peroxy-(2-ethylhexyl)ester (commercially available from Arkema, Inc. (King of Prussia, PA) under the trade designation LUPEROX TBEC) or 3,5,5-trimethylhexanoic acid-tertiary-butyl-peroxyester (commercially available from Arkema, Inc. (King of Prussia, PA) under the trade designation LUPEROX 270) can be used as organic peroxides according to embodiments of the present disclosure.

Metal salts that may be used with the barbituric acid derivative can include transition metal complexes, especially salts of cobalt, manganese, copper, iron, or combinations thereof. When the metal salt is a copper compound, the salt may possess the general formula $CuX_n$, where X is an organic and/or inorganic anion and n=1 or 2. Examples of suitable copper salts include copper chloride, copper acetate, copper acetylacetonate, copper naphthenate, copper salicylate or complexes of copper with thiourea or ethylenediaminetetraacetic acid, and mixtures thereof. In some embodiments, the copper compound is copper naphthenate.

Another redox initiator system suitable for use in embodiments of the present disclosure comprises an inorganic peroxide, an amine-based reducing agent, and an accelerator, where the amine may be an aromatic and/or aliphatic amine, and the polymerization accelerator is at least one selected from the group consisting of sodium benzenesulfinate, sodium p-toluenesulfinate, sodium 2,4,6-trisopropyl benzenesulfinate, sodium sulfite, potassium sulfite, calcium sulfite, ammonium sulfite, sodium bisulfate, and potassium bisulfate. An example of an inorganic peroxide useful in this system is peroxodisulfate as described in U.S. Pat. No. 8,545,225 (Takei, et al.).

In some embodiments, the curable composition includes a cure initiator system comprising a metal salt (e.g., copper naphthenate) and an ammonium salt (e.g., benzyl tributylammonium chloride). In some embodiments, curable composition includes a cure initiator system comprising a barbituric acid derivative and a metal salt and optionally comprising at least one of an organic peroxide and an ammonium chloride salt.

In some embodiments, the initiator is used in an amount effective to facilitate free radical addition to the addition-fragmentation crosslinking agent and the amount will vary depending upon, e.g., the type of initiator, and the molecular weight of the polymer and the degree of functionalization desired. In other embodiments, the initiator is used in an amount effect to facilitate cationic polymerization of an epoxy resin. The initiators can be used in amounts from about 0.001 part by weight to about 10 parts by weight based on 100 parts total monomer, oligomer, and polymer.

In some embodiments, the polymerizable (e.g. adhesive) compositions can be formed by combining the (e.g. free-radically polymerizable) ethylenically unsaturated monomers, oligomers, and polymers with the cyclic imide monomer and optional filler. The polymerizable or polymerized (e.g. adhesive) composition may optionally further comprise an organic solvent.

When solvents are present, a single organic solvent or a blend of solvents can be employed. Depending on the ethylenically unsaturated material(s), suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates, acetates, including propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

In another embodiment, a method of forming a coated substrate is described comprising applying a polymerizable (e.g. adhesive) composition to a surface of a substrate; and polymerizing the (e.g. ethylenically unsaturated and/or epoxy) polymerizable groups. In some embodiments, the polymerizable (e.g. adhesive) composition comprises at least one monomer, oligomer, polymer, or a combination thereof comprising ethylenically unsaturated groups; optionally inorganic particulate material; and at least one cyclic imide monomer comprising an (e.g. α, β-) unsaturated carbonyl as described herein. In other embodiments, the polymerizable (e.g. adhesive) composition comprises an epoxy resin, optionally hydroxyl functional component; and optionally inorganic particulate material; and at least one cyclic imide monomer comprising an (e.g. α, β-) unsaturated carbonyl as described herein. In yet other embodiments, the polymerizable (e.g. adhesive) composition comprises an epoxy resin, a (meth)acrylic polymer, optionally hydroxyl functional component; and optionally inorganic particulate material; and at least one cyclic imide monomer comprising an (e.g. α, β-) unsaturated carbonyl as described herein.

The substrate may comprise an organic material, an inorganic material, or a combination thereof.

The composition is polymerized at room temperature, elevated temperature, upon exposure to radiant energy, or a combination thereof. In some embodiments, the adhesive composition is applied and adhered to a single substrate, such as in the case of a sealant. In other embodiments, the method further comprises contacting the polymerizable composition with a second substrate. Thus, a first and second substrate are bonded to each other with the adhesive composition.

The (e.g. adhesive) coating composition can be applied as a single or multiple layers to a (e.g. display surface or film) substrate using conventional film application techniques. Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature. Although it is usually convenient for the substrate to be in the form of a roll of continuous web, the coatings may be applied to individual sheets.

The (e.g. adhesive) coating composition is dried in an oven to remove the optional solvent and then cured at room temperature, elevated temperature, upon exposure to radiant energy, or a combination thereof. In one embodiment, the (e.g. adhesive) coating composition is cured by exposure to actinic radiation preferably in an inert atmosphere (less than 50 parts per million oxygen). By definition, actinic radiation is electromagnetic radiation that is absorbed by one or more components of the photopolymerizable composition that ultimately leads to at least partial free-radical polymerization of the composition. Exemplary actinic radiation has a wavelength of from 250 nanometers to 700 nanometers. The actinic radiation is absorbed by both the photoinitiator and the organic photoactivatable reducing agent precursor, either simultaneously or sequentially. For example, the same or different wavelengths of actinic radiation may be used for the photoinitiator and the organic photoactivatable reducing agent precursor.

The source(s) of actinic radiation is/are selected such that the actinic radiation is of an appropriate wavelength to be absorbed by the photoinitiator and organic photoactivatable reducing agent precursor (e.g., photoacid generator). Exemplary sources of actinic radiation may include lasers (ultraviolet or visible), broad spectrum flashlamps (e.g., xenon flashlamps), and low-, medium-, and high-pressure mercury arc lamp mercury arc lamps, microwave-driven mercury lamps (e.g., using H-type, V-type, or D-type bulbs), and light emitting diode (LEDs). Further details associated with radiation curing are within the capabilities of those skilled in the art.

The thickness of the cured (e.g. adhesive) surface layer is typically at least 0.5 microns, 1 micron, or 2 microns. The thickness of the surface layer is generally no greater than 500 microns or 250 microns. In some embodiments, the thickness ranges from about 5 microns to 300 microns.

In some embodiments, due to its optical clarity, the (e.g. adhesive) composition described herein is useful for application to light-transmissive film substrates or optical displays. The light transmissive substrate may comprise or consist of any of a wide variety of inorganic materials, such as glass, or various thermoplastic and crosslinked organic polymeric materials, such as polyethylene terephthalate (PET), (e.g. bisphenol A) polycarbonate, cellulose acetate, poly(methyl methacrylate), and polyolefins such as biaxially oriented polypropylene which are commonly used in various optical devices. Further, the substrate may comprise a hybrid material, having both organic and inorganic components. The substrate and cured (e.g. adhesive) surface layer have a transmission of at least 80%, at least 85%, and preferably at least 90%. The initial haze (i.e. prior to abrasion testing) of the substrate and cured (e.g. adhesive) surface layer can be less than 1 or 0.5, or 0.4, or 0.2%.

In some embodiments, the substrate thickness is typically at least 20 microns and no greater than about 0.5 mm. In some embodiments, the thickness of the substrate is no greater than 250, 200, 150, or 100 microns. The polymeric material can be formed into a film using conventional filmmaking techniques such as by extrusion and optional uniaxial or biaxial orientation of the extruded film. The substrate can be treated to improve adhesion between the substrate and the adjacent layer, e.g., chemical treatment, corona treatment such as air or nitrogen corona, plasma, flame, or actinic radiation. If desired, an optional tie layer or primer can be applied to the substrate to increase the interlayer adhesion with the cured (e.g. adhesive) composition.

In other exemplary useful applications, compositions according to the present disclosure are disposed on a substrate (when used as a sealant) or between two substrates (and then exposed to the actinic radiation for sufficient time (e.g., from less than a second to several minutes) to cause a desired level of polymerization to occur. In some embodiments, the composition may be sandwiched between two releasable liners to make an adhesive transfer tape.

Substrates include, for example, metals (e.g., aluminum or stainless steel), plastics (e.g., a polyamide, a polycarbonate), and glasses. In particularly embodiments, the substrate is a glass, whether fritted or non-fritted, and the glass is bonded to another glass, or the glass is bonded to a metal. In some embodiments, the substrate(s) can be transparent (e.g., glass and/or plastic).

In some embodiments, the inclusion of the cyclic imide monomer(s) reduces the polymerization stress without diminishing the mechanical properties of the cured composition. In the case of the exemplified adhesive, the cured adhesive with and without the inclusion of the cyclic imide monomer(s) has about the same overlap shear values. In some embodiments, the inclusion of the cyclic imide monomer(s) improves crosshatch adhesion without diminishing the mechanical properties of the cured composition.

Unless stated otherwise, the following definitions are applicable to the detailed description:

"acryloyl" is used in a generic sense and mean not only derivatives of acrylic acid, but also amine, and alcohol derivatives, respectively;

"(meth)acryl" mean acryl and methacryl groups; and is inclusive of both esters and amides.

"curable" means that a coatable material can be transformed into a solid, substantially non-flowing material by means of free-radical polymerization, ring-opening polymerization, chemical crosslinking, radiation crosslinking, or the like.

"alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl, and the like. Unless otherwise noted, alkyl groups may be mono- or polyvalent, i.e. monovalent alkyl or polyvalent alkylene.

"heteroalkyl" includes both straight-chained, branched, and cyclic alkyl groups with one or more heteroatoms independently selected from S, O, and N with both unsubstituted and substituted alkyl groups. Unless otherwise indicated, the heteroalkyl groups typically contain from 1 to 20 carbon atoms. "Heteroalkyl" is a subset of "hydrocarbyl containing one or more S, N, O, P, or Si atoms" described below. Examples of "heteroalkyl" as used herein include, but are not limited to, methoxy, ethoxy, propoxy, 3,6-dioxaheptyl, 3-(trimethylsilyl)-propyl, 4-dimethylaminobutyl, and the like. Unless otherwise noted, heteroalkyl groups may be mono- or polyvalent, i.e. monovalent heteroalkyl or polyvalent heteroalkylene.

"(hetero)alkyl" means alkyl and heteroalkyl.

"aryl" is an aromatic group containing 6-18 ring atoms and can contain optional fused rings, which may be saturated, unsaturated, or aromatic. Examples of aryl groups include phenyl, naphthyl, biphenyl, phenanthryl, and anthracyl.

"heteroaryl" is aryl containing 1-3 heteroatoms such as nitrogen, oxygen, or sulfur and can contain fused rings. Some examples of heteroaryl groups are pyridyl, furanyl, pyrrolyl, thienyl, thiazolyl, oxazolyl, imidazolyl, indolyl, benzofuranyl, and benzthiazolyl. Unless otherwise noted, aryl and heteroaryl groups may be mono- or polyvalent, i.e. monovalent aryl or polyvalent arylene.

"(hetero)aryl" means aryl and heteroaryl.

EXAMPLES

Unless otherwise noted, all parts, percentages, ratios, etc. in the Examples and the rest of the specification are by weight. Unless otherwise indicated, all other reagents were obtained, or are available from fine chemical vendors such as MilliporeSigma, Burlington, MA, USA, or may be synthesized by known methods. Table 1 (below) lists materials used in the examples and their sources.

TABLE 1

Materials List

| DESIGNATION | DESCRIPTION | SOURCE |
|---|---|---|
| Cyclohexane | Cyclohexane | EMD Chemicals, Inc., Gibbstown, NJ, USA |
| Acetic anhydride | Acetic anhydride | EMD Chemicals, Inc. |
| Glycidyl methacrylate | Glycidyl methacrylate | Alfa Aesar, Haverhill, MA, USA |
| Methyl methacrylate oligomer mixture | Methyl methacrylate oligomer mixture | Prepared as described in Example 1 of U.S. Pat. No. 4,547,323 |
| Methyl methacrylate dimer | Methyl methacrylate dimer | Prepared as described in Preparative Example 1 |
| Diacid 1 | 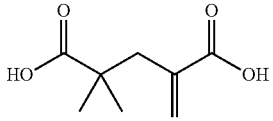 | Prepared as described in Preparative Example 2 |
| Anhydride 2 | 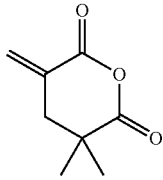 | Prepared as described in Preparative Example 3 |
| CIM-2 | 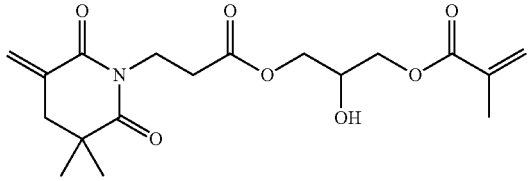 [SMILES: C=C(C)C(=O)OCC(O)COC(=O)CCN1C(=O)C(=C)CC(C)(C)C1=O] | Prepared as described in Preparative Example 4 |
| CIM-7 | 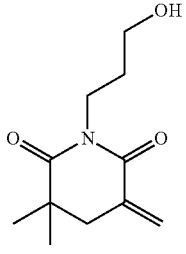 | Prepared as described in Preparative Example 5 |
| BCIM-1 | 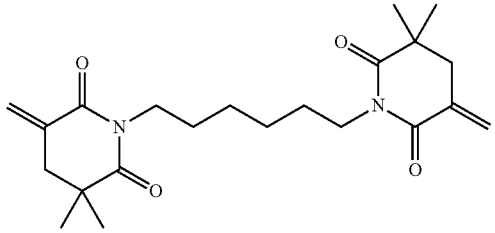 | Prepared as described in Preparative Example 6. |
| AFM-1 | 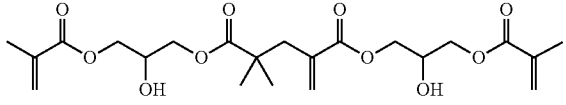 [SMILES: C=C(C)C(=O)OCC(O)COC(=O)C(=C)CC(C)(C)C(=O)OCC(O)COC(=O)C(=C)C] | Prepared as described in Preparative Example 7 |

TABLE 1-continued

Materials List

| DESIGNATION | DESCRIPTION | SOURCE |
|---|---|---|
| CIM-11 | 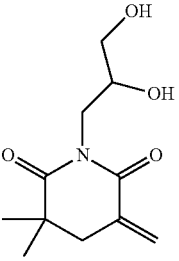 [SMILES: C=C1CC(C)(C)C(=O)N(CC(O)CO)C1=O] | Prepared as described in Preparative Example 9 |
| β-alanine | 3-aminopropanoic acid | MilliporeSigma, Burlington, MA, USA |
| 5-amino-1-pentanol | $NH_2(CH2)_5OH$ | MilliporeSigma |
| 3-amino-1,2-propanediol | $NH_2CH_2CH(OH)CH_2OH$ | MilliporeSigma |
| $Ph_3P$ | Triphenyl phosphine, $P(C_6H_5)_3$ | MilliporeSigma |
| $Ph_3Sb$ | Triphenyl antimony, $(C_6H_5)_3Sb$ | MilliporeSigma |
| 3-amino-1,2-propanediol | $NH_2CH_2CH(OH)CH_2OH$ | MilliporeSigma |
| 1,6-diaminohexane | $H_2N(CH_2)_6NH_2$ | MilliporeSigma |
| DCP | Tricyclodecane dimethanol dimethacrylate obtained as NK ESTER DCP, High Tg monomer | Kowa Shin Nakamura, Tokyo, Japan |
| HEMA | 2-hydroxy ethyl methacrylate (Tg = 85° C.) | TCI Chemicals |
| ISTA | Isostearyl acrylate (liquid at 25° C.) obtained as NK ESTER S1800 ALC (Tg = 35° C. approx.) | Kowa Shin Nakamura |
| LMA | lauryl methacrylate obtained as SR 313A (Tg = −65° C.) | Sartomer, Exton, PA, USA |
| MAA | Methacrylic acid (Tg = 223° C.) | MilliporeSigma |
| MMA | Methyl methacrylate (Tg = 105° C.) | MilliporeSigma |
| IBOMA | Isobornyl methacrylate obtained as IBXMA (Tg = 191° C.) | Mitsubishi, Tokyo, Japan |
| UDMA | urethane dimethacrylate having the following formula 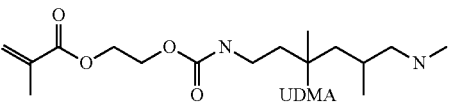 (Tg = −38° C.) | Sartomer |
| Beads | Spacer beads (6 mil) obtained as ENVIROSPHERES SL300 | Palmer Holland, North Olmsted, OH, USA |
| 2021P | A cycloaliphatic epoxide with the epoxide groups integral to the cycloaliphatic ring, obtained as CELLOXIDE 2021P | Daicel Corporation, Osaka, Japan |
| CAPA 3031 | A liquid triol terminated with primary hydroxyl groups, obtained as CAPA 3031 | Ingevity, North Charleston, South Carolina |
| UVI 6976 | Photoacid generator, obtained as SYNA PI 6976 | Synasia Inc., Metuchen, New Jersey |
| M1088 | 2-(1,2-Cyclohexadienyldicarboximide) ethyl acrylate obtained as MIRAMER M1088 | Miwon, Yongin, South Korea |
| $Cu(nap)_2$ | Copper (II) naphthenate, 8% in mineral spirits | Strem Chemicals, Newburyport, MA, USA |
| TPO | Diphenyl(2,4,6-trimethylbenzoyl)phosphine oxide obtained as OMNIRAD TPO | iGM Resins USA, Charlotte, NC, USA |
| PROSTAB | 1-Piperidinyloxy, 4-hydroxy-2,2,6,6-tetramethyl obtained as PROSTAB 5198 | Fisher Scientific, Waltham, MA, USA |

TABLE 1-continued

Materials List

| DESIGNATION | DESCRIPTION | SOURCE |
|---|---|---|
| XT100 | MMA-butadiene-styrene (MBS) core-shell impact modifier particles obtained as CLEARSTRENGTH XT100 | Arkema, King of Prussia, PA, USA |
| BTAC | benzyltributylammonium chloride | Alfa Aesar |
| BTAC 40% in HEMA | benzyltributylammonium chloride 40 wt % in 2-hydroxyethyl methacrylate | Obtained by dissolving BTAC in HEMA at 40 wt % at room temperature. |
| PKLAB | Filler obtained as LKAB PW80 | LKAB Minerals, Luleå, Sweden |
| CabTS720 | fumed silica obtained as CAB-O-SIL TS-720 | Cabot |
| ACCELERATOR | Structural adhesive accelerator available as SCOTCH-WELD DP8410NS | 3M Company, St. Paul, MN, USA |
| BYK-S-782 | Dispersed wax obtained as BYK-S-782 | BYK, Wesel, Germany |
| SR351H | Trimethylolpropane triacrylate, obtained as SR351H | Sartomer, Exton, PA, USA |
| SR339 | 2-phenoxyethyl acrylate, obtained as SR339 | Sartomer, Exton, PA, USA |
| IRG 819 | Bis(2,4,6-trimethylbenzoyl)phenylphosphine oxide, obtained as IRGACURE 819 | Ciba Specialty Chemicals, Basel, Switzerland |

Test Methods

Watts Deflection Test Method

Precision arbor shims (1/16") were adhered with cyanoacrylate adhesive (3M Scotch Super Glue, 3M Company, St. Paul, MN, USA) onto glass slides (25 mm×75 mm) that were primed with a silane primer (3M RelyX, 3M Company, St. Paul, MN, USA). The precision arbor shims were filled, on the non-adhered side, with the adhesive formulation of choice. Subsequently, a silane-primed (3M RelyX, 3M Company, St. Paul, MN, USA) round cover glass slip (25 mm #1) was firmly pressed onto the adhesive, making it overflow the arbor shim hole. After the samples were allowed to cure for 24 hours at 20° C. the samples were sprayed with Helling 3D Scan Spray (LaserDesign, Minneapolis, MN, USA) before imaging using a Keyence VR-3200 Laser Scanning Microscope (Keyence, Osaka, Japan). Deflection measurements were made comparing the center of the cover glass slip to the glass directly above the arbor shim. These measurements were analyzed by Matlab (Mathworks, Natick, MA, USA) code that calculated the polynomial curve fits for the deflection and output the deflection data based on the inner diameter of the arbor shims. Each adhesive formulation was tested in triplicate, and averages and standard deviations were calculated and provided.

Overlap Shear Test Method

Aluminum substrates (1 inch×4 inches×0.064 inch, (2.5 cm×10 cm×0.16 cm)) were washed with methyl ethyl ketone or acetone, air dried for at least 5 minutes, abraded with a Scotch-Brite General Purpose Hand Pad #7447 (3M, St. Paul, MN, USA) on the terminal 2 cm of one end, rinsed with methyl ethyl ketone or acetone, and allowed to air dry for at least 5 min prior to use. The adhesive formulation of choice was placed on the abraded portion of the substrate. A second abraded aluminum substrate was applied to the substrate with adhesive, thus closing the bond (bond area=0.5 inch×1 inch (1.3 cm×2.5 cm). The bond was clamped with binder clips and allowed to sit at room temperature for 72 hours (to cure) prior to testing. Dynamic overlap shear testing was performed at ambient temperature using a CRITERION Tensile Tester (MTS Sintech, Eden Prairie, MN, USA), with a 10 kN loadcell. Specimens were loaded into the grips and the crosshead was operated at 0.2 inches per minute (0.5 cm/min), loading the specimen to failure. Stress at break was recorded in units of pounds per square inch (psi) and converted to kilopascals (kPa). Each adhesive formulation was tested in triplicate, and averages and standard deviations were calculated and provided.

Crosshatch Adhesion Testing Method 1

Crosshatch adhesion testing was performed on glass microscope slides (Fisherbrand Plain Microscope Slides 12-550B, Fisher Scientific, Waltham, MA, USA), smooth aluminum substrates (1 inch×4 inches×0.064 inch, (2.5 cm×10 cm×0.16 cm)) or polycarbonate substrates (Plastics International, Eden Prairie, MN, USA) item No. LEX-118-S, 0.118 inches×1 inch×4 inches). Glass, smooth aluminum, and polycarbonate substrates were washed with isopropyl alcohol and dried for at least 10 minutes before using. Rough aluminum substrates were prepared using smooth aluminum substrates and washing with methyl ethyl ketone (MEK), air drying for at least 10 minutes, then abrading with a Scotch-Brite General Purpose Hand Pad #7447 (3M, St. Paul, MN, USA) (3M Company, St. Paul, Minnesota), rinsing with MEK, and drying for at least 60 min before using. Samples were prepared by depositing 0.25 mL of an adhesive formulation of choice onto the substrate via pipette, covering with an RF02N liner, (SKC Haas, Cheonan, South Korea; 2 mil thick; 51 micrometers thick), and curing using a Clearstone CF1000 UV LED system (395 nm, 100% intensity, 2 minutes (min), 1 cm above substrate). Crosshatch adhesion tests were performed as described in ASTM D3359-09 (Standard Test Methods for Measuring Adhesion by Tape Test, 2009 Revision 2) where 0B denotes poor adhesion (greater than 65% of area detached) through a range up to 5B which denotes the best adhesion (no detachment and no damage to scored crosshatch lines).

Crosshatch Adhesion Testing Method 2

Crosshatch adhesion testing was performed on glass microscope slides (Fisherbrand Plain Microscope Slides 12-550B, Fisher Scientific, Waltham, MA, USA), aluminum substrates (1 inch×4 inches×0.064 inch, (2.5 cm×10 cm×0.16 cm)) or polycarbonate substrates (Plastics International, Eden Prairie, MN, USA) item No. LEX-118-S, 0.118 inches×1 inch×4 inches). Samples were prepared by depositing 0.25 mL of an adhesive formulation of choice onto the substrate via pipette, covering with an RF02N liner, (SKC Haas, Cheonan, South Korea; 2 mil thick; 51 micrometers thick), and curing with two passes on an OmniCure AC475 lamp (Excelitas Technologies, Waltham, MA, USA) conveyor belt and irradiating with 365 nm light, at 2 fpm 75-95% power providing a total dosage of 1.7 J/cm measured with an EIT Power Puck II (EIT LLC, Leesburg, VA. After the first pass on the conveyor belt, the liner was removed. After the second pass through the conveyor belt the samples were placed in a 70° C. oven for 2 h. Crosshatch adhesion tests were performed as described in ASTM D3359-09 (Standard Test Methods for Measuring Adhesion by Tape Test, 2009 Revision 2) where 0B denotes poor adhesion (greater than 65% of area detached) through a range up to 5B which denotes the best adhesion (no detachment and no damage to scored crosshatch lines).

Crosshatch Adhesion Testing Method 3

Crosshatch adhesion testing was performed on glass microscope slides (Fisherbrand Plain Microscope Slides 12-550B, Fisher Scientific, Waltham, MA, USA). Samples were prepared by coating the adhesive formulation of choice onto the substrate using a #10 Mayer rod, covering with an RF02N liner, (SKC Haas, Cheonan, South Korea; 2 mil thick; 51 micrometers thick), and curing with two passes on an OmniCure 7300 lamp (Excelitas Technologies, Waltham, MA, USA) conveyor belt and irradiating with 365 nm light, at 2 fpm 75-95% power providing a total dosage of 1.7 J/cm measured with an EIT Power Puck II (EIT LLC, Leesburg, VA. After the first pass on the conveyor belt, the liner was removed. After the second pass through the conveyor belt the samples were placed in a 70° C. oven for 2 h. Crosshatch adhesion tests were performed as described in ASTM D3359-09 (Standard Test Methods for Measuring Adhesion by Tape Test, 2009 Revision 2) where 0B denotes poor adhesion (greater than 65% of area detached) through a range up to 5B which denotes the best adhesion (no detachment and no damage to scored crosshatch lines).

TABLE 2

Crosshatch Adhesion Ratings for ASTM D3359-09

| RATING | DESCRIPTION |
|--------|-------------|
| 5B | 0% of surface area removed |
| 4B | Less than 5% |
| 3B | 5-15% |
| 2B | 15-35% |
| 1B | 35-65% |
| 0B | Greater than 65% |

PREPARATIVE EXAMPLES

Preparative Example 1: Synthesis of Methyl Methacrylate Dimer

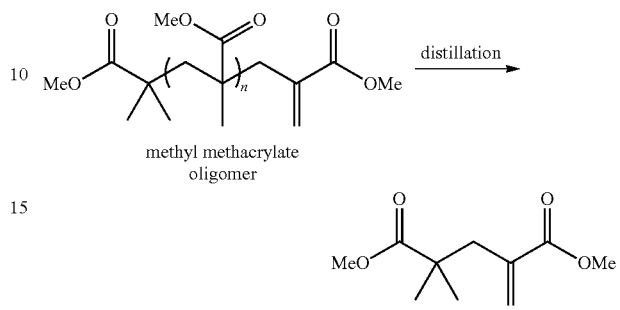

A methyl methacrylate oligomer mixture was prepared according to the procedure described in Example 1 of U.S. Pat. No. 4,547,323 (Carlson, G. M.). The mixture was distilled as described in Moad, C. L.; Moad, G.; Rizzardo, E.; and Thang, S. H. Macromolecules, 1996, 29, 7717-7726, with details as follows:

A 1 liter (L) round-bottomed flask equipped with a magnetic stir bar was charged with 500 grams (g) of methyl methacrylate oligomer mixture. The flask was fitted with a Vigreux column, a condenser, a distribution adapter, and four collection flasks. With stirring, the distillation was placed under reduced pressure (0.25 mm Hg). The oligomer mixture was stirred under reduced pressure at room temperature until gas evolution (removal of methyl methacrylate monomer) had largely subsided. The distillation pot was then heated to reflux in an oil bath to distill the oligomer mixture at reduced pressure to provide the desired dimer.

Preparative Example 2: Synthesis of Diacid 1

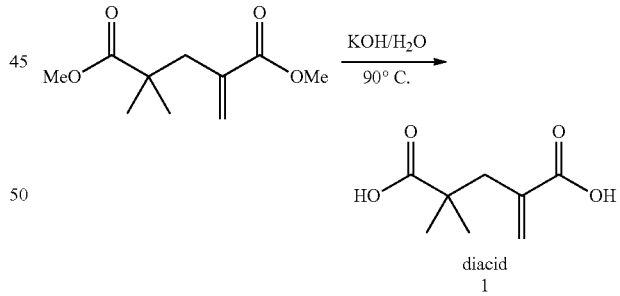

The methyl methacrylate dimer was hydrolyzed to diacid 1 as described in Hutson, L.; Krstina, J.; Moad, G.; Morrow, G. R.; Postma, A.; Rizzardo, E.; and Thang, S. H. Macromolecules, 2004, 37, 4441-4452, with details as follows.

A 1 L, round-bottomed flask equipped with a magnetic stir bar was charged with deionized (DI) water (302 milliliters (mL)) and potassium hydroxide (90.46 g, 1612 millimole (mmol)). The mixture was stirred until homogeneous. Methyl methacrylate dimer (120.0 g, 599.3 mmol) was added. The reaction was equipped with a reflux condenser and was heated to 90° C. in an oil bath. After 17 hours, the reaction was removed from the oil bath and was allowed to cool to room temperature. The reaction solution was acidified to pH~0 using concentrated HCl. A white precipitate formed upon acidification. The heterogeneous mixture was vacuum filtered and the white solid was washed quickly with DI water (twice with 50-100 mL). The white solid was then recrystallized from DI water (220 mL). The recrystallized solid was collected via vacuum filtration using a Buchner funnel. The collected solids were then quickly washed with DI water (twice with 50 mL). The solid was further dried under high vacuum to provide diacid 1 (86.67 g, 503.4 mmol, 84%) as a fine white solid.

Preparative Example 3: Synthesis of Anhydride 2

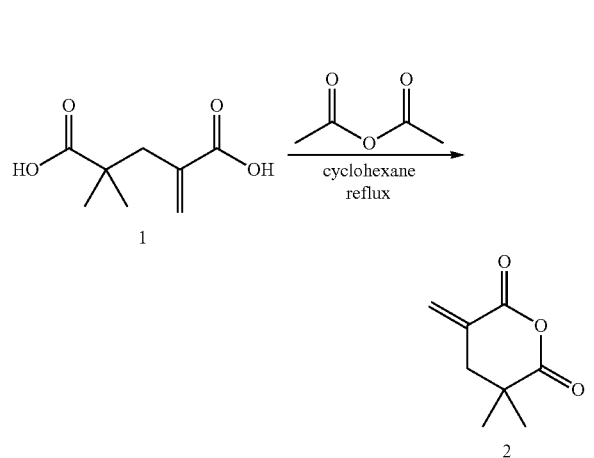

A 1 L round-bottomed flask equipped with a magnetic stir bar was charged with diacid 1 (50.00 g, 290.4 mmol), cyclohexane (500 mL), and acetic anhydride (73.30 mL, 79.16 g, 775.4 mmol). The reaction flask was equipped with a Dean-Stark trap and a reflux condenser. With, stirring, the reaction was heated to reflux in an oil bath. The solution was refluxed for 2 hours during which approximately 200 mL of colorless liquid was removed from the Dean-Stark trap. After 2 hours, the reaction was removed from the oil bath and was allowed to cool to room temperature. A white solid precipitated out of solution as it cooled. The precipitate was collected via vacuum filtration using a Buchner funnel and was quickly washed with cyclohexane (75 mL). The white solid was then recrystallized from cyclohexane (400 mL). The recrystallized solid was collected via vacuum filtration using a Buchner funnel and was washed with cyclohexane (2×75 mL). The solid was further dried under high vacuum to provide anhydride 2 (34.83 g, 225.9 mmol, 78%) as a white crystalline solid.

Preparative Example 4: Synthesis of CIM-2

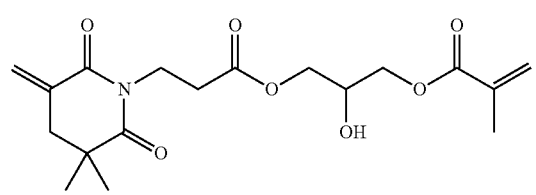 [SMILES: C=C(C)C(=O)OCC(O)COC(=O)CCN1C(=O)C(=C)CC(C)(C)C1=O]

An approximately 8 mL amber glass vial equipped with a magnetic stir bar was charged with CIM-1 (2.00 g, 8.879 mmol) and glycidyl methacrylate (1.262 g, 8.878 mmol), and triphenyl antimony (0.0188 g, 0.0532 mmol). The reaction was sealed with a Teflon-lined plastic cap. With stirring, the mixture was heated to 100° C. in an oil bath. After 18 hours, triphenyl phosphine (0.0046 g, 0.0178 mmol) was added. The reaction was kept stirring at 100° C. After an additional 9 hours, the reaction was sampled and $^1$H NMR analysis was consistent with the desired product as a mixture of isomers. The reaction was cooled to room temperature to provide CIM-2 (3.224 g, 8.775 mmol, 99%) as a clear, colorless viscous oil.

Preparative Example 5: Synthesis of CIM-7

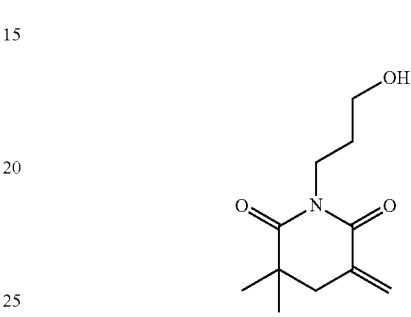

An approximately 240 mL amber glass bottle with Teflon-wrapped threads and equipped with a magnetic stir bar was charged with anhydride 2 (25.00 g, 162.2 mmol) and then placed in a room-temperature water bath. Next, 3-amino-1-propanol (12.3 mL, 12.18 g, 162.2 mmol) was added over 5 minutes. The bottle was then equipped with a lid adapted to apply vacuum. The bottle was placed in a 125° C. oil-bath and stirred. After 30 minutes at 125° C., the reaction was placed under vacuum. After an additional 4 hours, the reaction was backfilled with nitrogen and allowed to cool to room temperature to provide a clear yellow viscous liquid. The reaction was opened to the atmosphere and dissolved in a 90:10 mixture of dichloromethane and ethyl acetate. The crude product mixture was purified by filtering twice through a plug of silica gel (~7.5 cm wide by 15 cm tall) using a 90:10 mixture of dichloromethane and ethyl acetate as eluent. The eluent was concentrated in vacuo to a colorless oil. The crude product mixture was further purified by filtering twice more through a plug of silica gel (~7.5 cm wide by 15 cm tall) using a 90:10 mixture of dichloromethane and ethyl acetate as eluent for the first filtration and a gradient from 95:5 to 90:10 mixture of dichloromethane and ethyl acetate as eluent to provide CIM-7 (11.13 g, 52.68 mmol, 32%) as a colorless oil. $^1$H NMR analysis was consistent with the desired product.

Preparative Example 6: Synthesis of BCIM-1

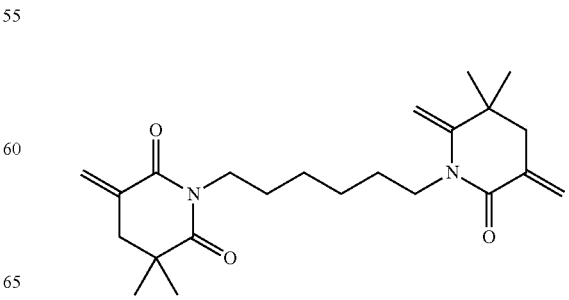

An approximately 40 mL glass bottle equipped with a magnetic stir bar was charged with anhydride 2 (34.52 g, 223.92 mmol) and 1,6-diaminohexane (13.02 g, 111.96 mmol). The two solid reagents were mixed well using a wooden applicator. The reaction vessel was then capped with a screw-on vacuum adapter and placed under a nitrogen atmosphere. With stirring, the mixture was heated to 125° C. in an oil bath. After 20 minutes, the reaction was placed under vacuum (~0.3 mm Hg). After an additional 3 hours, the reaction was removed from the oil bath, the cap was removed, and the reaction mixture was allowed to cool to room temperature open to the atmosphere. The crude product mixture was taken up in dichloromethane (75 mL) and was filtered through a plug of silica gel (~4 cm wide by 10 cm tall) using an 80:20 mixture of hexane:ethyl acetate as eluent. The filtered solution was concentrated in vacuo. The silica gel filtration was repeated 5 more times. The product was then dried under high vacuum to provide BCIM-1 (8.3594 g, 21.52 mmol, 19.2%) as a white solid. $^1$H NMR analysis was consistent with the desired product.

Preparative Example 7: Synthesis of CIM-1

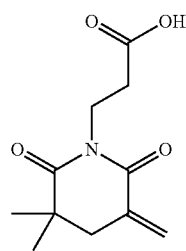 [SMILES: C=C1CC(C)(C)C(=O)N(CCC(=O)O)C1=O]

An approximately 40 mL amber glass bottle equipped with a magnetic stir bar was charged with anhydride 2 (15.00 g, 97.30 mmol) and β-alanine (8.668 g, 97.30 mmol). The two solid reagents were mixed well using a wooden applicator. The reaction was sealed with a Teflon-lined plastic cap. With stirring, the mixture was heated to 125° C. in an oil bath. After 4 hours, the reaction was removed from the oil bath, the cap was removed, and the reaction mixture was allowed to cool to room temperature open to the atmosphere. The crude product mixture was purified by filtering twice through a plug of silica gel (~4 cm wide by 10 cm tall) using a 50:50 mixture of hexane and ethyl acetate as eluent to provide CIM-1 (13.835 g, 61.42 mmol, 63%) as a white solid. 1H NMR analysis was consistent with the desired product.

Preparative Example 8: Synthesis of CIM-9

CIM-9

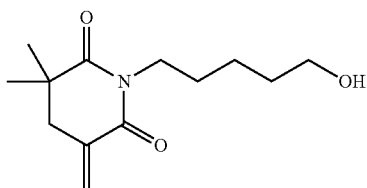

An approximately 240 mL amber glass bottle with Teflon-wrapped threads and equipped with a magnetic stir bar was charged with anhydride 2 (25.00 g, 162.2 mmol) and then placed in a room-temperature water bath. Next, 5-amino-1-pentanol (17.5 mL, 16.7 g, 162.2 mmol) was added over 10 minutes. The bottle was placed in a 125° C. oil bath with stirring and open to the atmosphere. After 30 minutes, the bottle was equipped with a lid adapted to apply vacuum and the reaction was placed under vacuum. After an additional 3.5 hours, the reaction allowed to cool to room temperature and opened to the atmosphere to provide a clear yellow sticky material. The reaction was opened to the atmosphere and dissolved in a 90:10 mixture of dichloromethane and ethyl acetate. The crude product mixture was purified by filtering four times through a plug of silica gel (~2.5 cm wide by 12.5 cm tall) using a 90:10 mixture of dichloromethane and ethyl acetate as eluent. After the final silica gel plug filtration, the eluent was concentrated in vacuo to a colorless viscous oil. This oil was further dried by bubbling air through the material using an 18 gauge needle to provide CIM-9 (11.91 g, 49.78 mmol, 31%) as a clear, colorless viscous liquid. 1H NMR analysis was consistent with the desired product.

Preparative Example 9: Synthesis of CIM-11

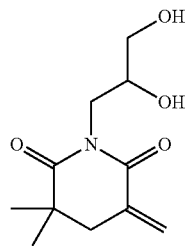 [SMILES: C=C1CC(C)(C)C(=O)N(CC(O)CO)C1=O]

An approximately 240 mL glass bottle with Teflon-wrapped threads and equipped with a magnetic stir bar was charged with anhydride 2 (25.00 g, 162.2 mmol) and (+/−) 3-amino-1,2-propanediol (14.78 g, 162.2 mmol). The bottle was then equipped with a lid adapted to apply vacuum. The bottle was placed in an oil bath heated to 125° C. and stirred. After 15 minutes at 125° C., the reaction vessel was placed under active vacuum. The active vacuum was shut off and the reaction was left under static vacuum for 5 minutes and then placed briefly back under active vacuum. This sequence was repeated twice more and then the reaction was left under static vacuum with stirring at 125° C. for 4 hours. The reaction was then backfilled with nitrogen and allowed to cool to room temperature to provide a yellow/orange glass solid. The crude reaction product was dissolved in dichloromethane with the aid of sonication for 30 minutes. The crude product mixture was then filtered through a plug of silica gel (~12.5 cm wide by 7.5 cm tall) using a 97:3 mixture of dichloromethane and methanol as eluent. The eluent was concentrated in vacuo to a colorless viscous liquid. The crude product mixture was once more filtered through a plug of silica gel (~12.5 cm wide by 7.5 cm tall)

using a 95:05 mixture of dichloromethane and methanol as eluent to provide CIM-11 (11.87 g, mmol, 32%) as a colorless oil. 1H NMR analysis was consistent with the desired product.

Preparative Example 10: Synthesis of AFM1

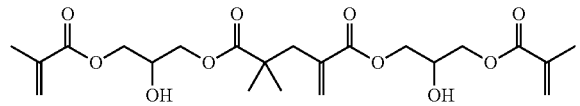 [SMILES: C=C(C)C(=O)OCC(O)COC(=O)C(=C)CC(C)(C)C(=O)OCC(O)COC(=O)C(=C)C]

An approximately 250 mL amber bottle equipped with a magnetic stir bar was charged with glycidyl methacrylate (23.0 mL, 24.8 g, 174 mmol) and triphenyl antimony (0.369 g, 1.04 mmol). The reaction was covered with a plastic cap with two 16-gauge needles pierced through the cap to allow air into the reaction. With stirring, the mixture was heated to 100° C. in an oil bath. Diacid 1 (15.0 g, 87.1 mmol) was added to the reaction in small portions over a period of 1.5 hours. After 21 hours, triphenyl phosphine (0.091 g, 0.35 mmol) was added. The reaction was kept stirring at 100° C. After an additional 6.5 hours the reaction was sampled. $^1$H NMR analysis was consistent with the desired product as a mixture of isomers and indicated consumption of glycidyl methacrylate. The reaction was cooled to room temperature to provide AFM1 as a clear, very pale-yellow viscous material.

EXAMPLES

Structural Adhesive Base Formulations

Structural adhesive base formulations (BASE1 to BASE4) were prepared by combining all components according to Table 3 except for the cyclic imide monomers into a polypropylene mixing cup (from FlackTek, Inc., Landrum, SC, USA). The cup was closed with a polypropylene lid and the mixture was high shear mixed at ambient temperature and pressure using a SPEEDMIXER (Hauschild SpeedMixer Inc., Dallas, TX, USA) for at least 30 seconds (s) at 2000 revolutions per minute (rpm). After this first mixing step, the described cyclic imide monomer was added (CIM7 to BASE2, BCIM1 to BASE3, or comparative additional fragmentation monomer, AFM1, to BASE4) in an amount according to Table 3. The formulations were again mixed for at least 30 s at 2000 rpm as described above.

TABLE 3

Structural Adhesive Base Formulation Compositions

| | FORMULATION | | | |
|---|---|---|---|---|
| COMPONENT | Control BASE 1 | BASE 2 | BASE 3 | Control BASE 4 |
| HEMA, wt. % | 14.10 | 14.00 | 13.91 | 13.89 |
| LMA, wt. % | 1.10 | 1.09 | 1.08 | 1.08 |
| MMA, wt. % | 21.70 | 21.55 | 21.41 | 21.37 |
| IBOMA, wt. % | 9.70 | 9.63 | 9.56 | 9.55 |
| MAA, wt. % | 17.30 | 17.18 | 17.06 | 17.04 |
| UDMA, wt. % | 13.80 | 13.70 | 13.62 | 13.59 |
| Cu(nap)$_2$, wt. % | 0.10 | 0.10 | 0.10 | 0.10 |
| BTAC 40% in HEMA, wt. % | 2.00 | 1.99 | 1.98 | 1.97 |
| XT100, wt. % | 10.60 | 10.52 | 10.46 | 10.43 |
| PKLAB, wt. % | 5.40 | 5.36 | 5.32 | 5.32 |
| CabTS720, wt. % | 4.20 | 4.17 | 4.14 | 4.14 |
| CIM7, wt. % | | 0.71 | | |
| BCIM1, wt. % | | | 1.36 | |
| AFM1, wt. % | | | | 1.52 |

Examples EX1 to EX4 and Comparative Examples CE1 to CE4

Structural adhesive Examples EX1 to EX4 and Comparative Examples CE1 to CE4 were created as follows. The components of a given Example formulation as shown in Table 4 were combined in a polypropylene mixing cup (from FlackTek, Inc., Landrum, SC). The cup was closed with a polypropylene lid and the mixture was high shear mixed at ambient temperature and pressure using a SPEEDMIXER (Hauschild SpeedMixer Inc., Dallas Texas) for 20 s at 2000 revolutions per minute (rpm).

TABLE 4

Compositions of Examples EX1 to EX4 and Comparative Examples CE1 to CE4

| | EXAMPLE | | | | | | | |
|---|---|---|---|---|---|---|---|---|
| COMPONENT | CE1* | EX1 | EX2 | CE2** | CE3* | EX3 | EX4 | CE4** |
| BASE1, parts by weight (pbw) | 10 | | | | | | | |
| BASE2, pbw | | 10 | | | | 10 | | |
| BASE3, pbw | | | 10 | | | | 10 | |
| BASE4, pbw | | | | 10 | | | | 10 |
| ACCELERATOR, pbw | 1 | 1 | 1 | 1 | 1 | 1 | 1 | 1 |
| Beads, pbw | | | | | 0.05 | 0.05 | 0.05 | 0.05 |

*Control containing no cyclic imide monomers
**Control containing acyclic addition-fragmentation monomer Freshly mixed Examples EX1 and EX2 and Comparative Examples CE1 and CE2 were used as the adhesive formulations of choice according to the general test method for the Watts deflection test. The test specimens were prepared within 4 minutes after mixing. The results of the testing are shown in Table 5.

TABLE 5

Results of Watts Deflection Testing

| EXAMPLE | CE1 (CONTROL)* | EX1 | EX2 | CE2 (CONTROL)** |
|---|---|---|---|---|
| Average of Watts Deflection, mm | 0.195 | 0.163 | 0.144 | 0.209 |
| Std. Dev. Of Watts Deflection, mm | 0.015 | 0.010 | 0.006 | 0.021 |

*Control containing no cyclic imide monomers
**Control containing acyclic addition-fragmentation monomer Freshly mixed Examples CE3, EX3, EX4, and CE4 were used as the adhesive formulations of choice according to the general test method for overlap shear. The test specimens were prepared within 4 minutes after mixing. The results of the testing are shown in Table 6.

TABLE 6

Results of Overlap Shear Testing

| EXAMPLE | CE3 (CONTROL)* | EX3 | EX4 | CE4 (CONTROL)** |
|---|---|---|---|---|
| Average stress at break, psi (kPa) | 993.8 (6852) | 1195.9 (8245) | 1219.1 (8405) | 1043.7 (7196) |
| Std. dev. of stress at break, psi (kPa) | 349.5 (2410) | 78.6 (542) | 129.5 (893) | 311.3 (2146) |

*Control containing no cyclic imide monomers
**Control containing acyclic addition-fragmentation monomer

Examples EX5 to EX6 and Comparative Example CE5

Example compositions EX5 to EX6 and Comparative Example composition CE5 were created as follows. The components of a given Example formulation as shown in Table 7 were combined in a polypropylene mixing cup (from FlackTek, Inc., Landrum, SC). The cup was closed with a polypropylene lid and the mixture was high shear mixed at ambient temperature and pressure using a SPEEDMIXER (Hauschild SpeedMixer Inc., Dallas Texas) for 20 s at 2000 revolutions per minute (rpm).

TABLE 7

Compositions of Examples EX5 to EX6 and Comparative Example CE5

| COMPONENT | CE5 (CONTROL) | EX5 | EX6 |
|---|---|---|---|
| ISTA, parts by weight (pbw) | 47.5 | 47.5 | 47.5 |
| IBOMA, pbw | 28.5 | 28.5 | 28.5 |
| DCP, pbw | 19.0 | 19.0 | 19.0 |
| TPO, pbw | 4.99 | 4.99 | 4.99 |
| PROSTAB, pbw | 0.01 | 0.01 | 0.01 |
| CIM-2, pbw | | 2.00 | |
| BCIM-1, pbw | | | 2.00 |

Examples EX5 to EX6 and Comparative Example CE5 were subjected to the Crosshatch Adhesion Test Method 1. The results are shown in Table 8. "Zero adhesion" denotes complete detachment from substrate after cure or during crosshatch grid cutting.

TABLE 8

Crosshatch Adhesion Results Using Test Method 1

| | EXAMPLE | | |
|---|---|---|---|
| | CE5 | EX5 | EX6 |
| Crosshatch adhesion rating (glass) | Zero adhesion | 4B | 5B |
| Crosshatch adhesion rating (smooth aluminum) | Zero adhesion | Zero adhesion | 1B |
| Crosshatch adhesion rating (polycarbonate) | 1B | 1B | 2B |

Examples EX7 to EX11 and Comparative Example CE6

Example compositions EX7 to EX11 and Comparative Example composition CE6 were created as follows. The components of a given Example formulation as shown in Table 9 were combined in a polypropylene mixing cup (from FlackTek, Inc., Landrum, SC). The cup was closed with a polypropylene lid and the mixture was high shear mixed at ambient temperature and pressure using a SPEEDMIXER (Hauschild SpeedMixer Inc., Dallas Texas) for 30 s at 2000 revolutions per minute (rpm).

TABLE 9

Compositions of Examples EX7 to EX11 and Comparative Example CE6 in wt %

| Example | 2021P | CAPA 3031 | UVI 6976 | CIM-1 | CIM-11 | CIM-9 | M1088 |
|---|---|---|---|---|---|---|---|
| EX7 | 22.4 | 67.2 | 9.4 | 1 | 0 | 0 | 0 |
| EX8 | 22.5 | 67.6 | 8.9 | 0 | 1 | 0 | 0 |
| EX9 | 22.1 | 66.3 | 10.6 | 0 | 0 | 1 | 0 |
| EX10 | 21.8 | 65.2 | 10 | 0 | 0 | 3 | 0 |
| EX11 | 22.8 | 68.2 | 8 | 0 | 0 | 0 | 1 |
| CE6 | 22.6 | 67.9 | 9.5 | 0 | 0 | 0 | 0 |

Examples EX7 to EX11 and Comparative Example CE6 were subjected to the Crosshatch Adhesion Test Method 2. The results are shown in Table 10. "Zero adhesion" denotes complete detachment from substrate after cure or during crosshatch grid cutting.

TABLE 10

Crosshatch Adhesion Results Using Test Method 2

| Example | Crosshatch adhesion rating (glass) | Crosshatch adhesion rating (rough aluminum) | Crosshatch adhesion rating (smooth aluminum) | Crosshatch adhesion rating (polycarbonate) |
|---|---|---|---|---|
| EX7 | 4B | 4B | Zero adhesion | Zero adhesion |
| EX8 | Some* | Zero adhesion | Zero adhesion | Zero adhesion |
| EX9 | 4B | 2B | 4B | Zero adhesion |
| EX10 | 5B | Zero adhesion | Zero adhesion | 5B |
| EX11 | 2B | 5B | Zero adhesion | 4B |
| CE6 | Some* | Zero adhesion | Zero adhesion | Zero adhesion |

Some*: Dewetting could be offset somewhat by placing the liner on top (NSNF), but for EX8 and CE6 on glass it was not possible to cut a high quality grid (hence 'some adhesion' instead of a number).

Examples EX12 to EX15 and Comparative Example CE7

Example compositions EX12 to EX15 and Comparative Example composition CE7 were created as follows. The components of a given Example formulation as shown in Table 11 were combined in a polypropylene mixing cup (from FlackTek, Inc., Landrum, SC). The cup was closed with a polypropylene lid and the mixture was high shear mixed at ambient temperature and pressure using a SPEED-MIXER (Hauschild SpeedMixer Inc., Dallas Texas) for 30 s at 2000 revolutions per minute (rpm).

TABLE 11

Compositions of Examples EX12 and Comparative Example CE7 in wt. %

| Example | CIM-11 | SR339 | SR351H | CAPA 3031 | 2021P | UVI 6976 | IRG 819 |
|---|---|---|---|---|---|---|---|
| EX12 | 0.5 | 26.6 | 21.2 | 34.7 | 11.5 | 4.3 | 1.2 |
| CE7 | 0 | 26.5 | 21.4 | 35.0 | 11.7 | 4.3 | 1.1 |

Example EX12 and Comparative Example CE7 were subjected to the Crosshatch Adhesion Test Method 3. The results are shown in Table 12.

TABLE 12

Crosshatch Adhesion Results Using Test Method 3

| Example | Crosshatch adhesion rating (glass) |
|---|---|
| EX12 | 4B |
| CE7 | 1B |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A composition comprising an adhesive composition and a cyclic imide monomer having the structure:

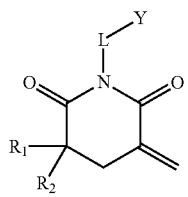

wherein L is a covalent bond or an organic linking group;
Y is alkyl, aryl, hydroxyl, carboxylic acid, or an ethylenically unsaturated polymerizable group; and
$R_1$ and $R_2$ are substituents; and
an epoxy resin.

2. The composition of claim 1 wherein $R_1$ and $R_2$ are substituents such that the cyclic imide monomer ring-opens during polymerization thereby forming radicals including C1 to C4 alkyl groups.

3. The composition of claim 1 wherein L is (hetero) alkylene or (hetero) arylene.

4. The composition of claim 1 wherein Y is a carboxylic acidic group or a (meth)acrylate group.

5. The composition of claim 1 wherein L comprises at least one hydroxyl group.

6. A composition comprising an adhesive composition and a cyclic imide monomer having the structure:

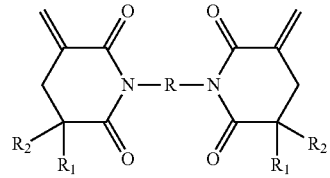

wherein R is an organic linking group; and
$R_1$ and $R_2$ are independently substituents; and
an epoxy resin.

7. The composition of claim 6 wherein $R_1$ and $R_2$ are substituents such that the cyclic imide monomer ring-opens during polymerization thereby forming radicals including C1 to C4 alkyl groups.

8. The composition of claim 6 wherein R is (hetero) alkylene or (hetero) arylene, optionally comprising at least one pendant ethylenically unsaturated polymerizable group.

9. The composition of claim 1 wherein the adhesive composition comprises less than 10, 9, 8, 7, 6, 5, 4, 3, 2, or 1 wt. % of the cyclic imide monomer.

10. The composition of claim 1 wherein the cyclic imide monomer comprises a (meth)acryl group.

11. The composition of claim 1 wherein the adhesive composition is a polymerizable composition or a polymerized composition.

12. The composition of claim 11 wherein the polymerizable composition comprises at least one monomer, oligomer, polymer, or a combination thereof comprising ethylenically unsaturated groups.

13. An adhesive coated article comprising a first substrate and the polymerized composition of claim 1 and a second substrate such the polymerized composition bonds the first substrate to the second substrate.

14. A composition comprising:
polymerized units having the structure:

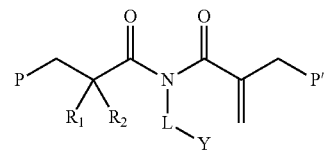

wherein L is a covalent bond or a linking group;
Y is alkyl, aryl, hydroxyl, carboxylic acid, or an ethylenically unsaturated group;
$R_1$ and $R_2$ are independently substituents; and
P and P' are independently polymerized units of an ethylenically unsaturated polymerizable monomer, oligomer, polymer, or combination thereof;
and an epoxy resin;
wherein the composition is an adhesive composition.

15. The composition of claim 6 wherein the adhesive composition comprises less than 10, 9, 8, 7, 6, 5, 4, 3, 2, or 1 wt. % of the cyclic imide monomer.

16. The composition of claim 6 wherein the cyclic imide monomer comprises a (meth)acryl group.

17. The composition of claim 6 wherein the adhesive composition is a polymerizable composition or a polymerized composition.

18. The composition of claim 17 wherein the polymerizable composition comprises at least one monomer, oligomer, polymer, or a combination thereof comprising ethylenically unsaturated groups.

19. An adhesive coated article comprising a first substrate and the polymerized composition of claim 6 and a second substrate such the polymerized composition bonds the first substrate to the second substrate.

20. An adhesive coated article comprising a first substrate and the polymerized composition of claim 14 and a second substrate such the polymerized composition bonds the first substrate to the second substrate.

* * * * *